United States Patent
Xia et al.

[11] Patent Number: 6,156,190
[45] Date of Patent: Dec. 5, 2000

[54] CONVERSION PROCESS OF HYDROCARBON OILS

[75] Inventors: Guofu Xia; Mei Zhu; Enze Min; Yahua Shi; Zhiping Tao; Guici Pang; Mingfeng Li; Guopeng Ran; Haitao Huang; Runqiang Zhang; Jian Li; Hong Nie, all of Beijing, China

[73] Assignees: China Petrochemical Corporation; Research Institute of Petroleum Processing, both of Beijing, China

[21] Appl. No.: 09/272,246

[22] Filed: Mar. 19, 1999

[30] Foreign Application Priority Data

Mar. 20, 1998 [CN] China ................... 98 1 00760

[51] Int. Cl.⁷ ............ C10G 45/04; C10G 45/00
[52] U.S. Cl. ............ 208/216 R; 208/217; 208/263; 208/264
[58] Field of Search ............... 208/216 R, 217, 208/263, 264

[56] References Cited

U.S. PATENT DOCUMENTS

| | | | |
|---|---|---|---|
| 3,852,744 | 12/1974 | Plundo et al. | 208/210 |
| 3,870,626 | 3/1975 | Plundo et al. | 208/216 |
| 3,876,532 | 4/1975 | Plundo et al. | 208/216 |
| 4,010,116 | 3/1977 | Secor et al. | 252/455 Z |
| 4,206,085 | 6/1980 | Lim et al. | 252/455 Z |
| 4,218,307 | 8/1980 | McDaniel | 208/120 |
| 4,325,845 | 4/1982 | Lim et al. | 252/455 Z |
| 4,325,847 | 4/1982 | Lim et al. | 252/455 Z |
| 4,454,241 | 6/1984 | Pine et al. | 502/68 |
| 4,465,780 | 8/1984 | Pine | 502/68 |
| 4,504,382 | 3/1985 | Pine | 708/114 |
| 4,542,118 | 9/1985 | Nozemack et al. | 502/6 Z |
| 4,567,152 | 1/1986 | Pine | 502/64 |
| 4,584,091 | 4/1986 | Pine | 208/114 |
| 4,657,663 | 4/1987 | Gardner et al. | 208/210 |
| 4,839,319 | 6/1989 | Schuette et al. | 502/64 |
| 4,977,622 | 12/1990 | Schley | 2/59 |

FOREIGN PATENT DOCUMENTS

| | | |
|---|---|---|
| 1005386 | 6/1988 | China . |
| 1005385 | 8/1988 | China . |
| 1037327 | 1/1992 | China . |
| 1024504 | 6/1992 | China . |
| 1026217 | 7/1992 | China . |
| 1034718 | 2/1995 | China . |
| 0252761 | 1/1988 | European Pat. Off. . |
| 0358261 | 3/1990 | European Pat. Off. . |
| 0397183 | 11/1990 | European Pat. Off. . |
| 63-270545 | 11/1988 | Japan . |
| 63-278553 | 11/1988 | Japan . |

*Primary Examiner*—Walter D. Griffin
*Assistant Examiner*—Tam M. Nguyen
*Attorney, Agent, or Firm*—Birch, Stewart, Kolasch & Birch, LLP

[57] ABSTRACT

A conversion process of hydrocarbon oils comprises at least a hydrodemercaptanization process, wherein said hydrodemercaptanization process comprises contacting a feedstock with a hydrofining catalyst containing a tungsten oxide and/or a molybdenum oxide, a nickel oxide and a cobalt oxide supported on an alumina under the conditions of hydrodemercaptanization, in which the content of said tungsten oxide and/or molybdenum oxide is from 4 wt % to less than 10 wt %, the nickel oxide content is 1–5 wt %, the cobalt oxide content is 0.01–1 wt % based on the catalyst, and the ratio of total atom number of nickel and cobalt to total atom number of nickel, cobalt, tungsten and/or molybdenum is 0.3–0.9. Said process can be carried out at a lower temperature and a lower H/oil volume ratio.

29 Claims, 5 Drawing Sheets

CONVERSION PROCESS OF HYDROCARBON OILS

This invention relates to a conversion process of hydrocarbon oils comprising at least a hydrofining process, more particularly, the invention relates to a conversion process of hydrocarbon oils, comprising at least a hydrodemercaptanization process and optionally a FCC process or an atmospheric distillation process of crude oil or a thermal cracking process of heavy oil.

Total sulfur content, mercaptan sulfur content and acid value are important indexes of middle distillates and light oil distillates. Part of the middle distillates and light oils, such as lamp kerosene, aviation kerosene and FCC gasoline, are qualified in total sulfur content, but not in mercaptan sulfur content and acid value. In recent years, to adapt the requirements of environmental protection and meet increasingly more severe quality requirements for middle distillates or light oils, such as lamp kerosene, aviation kerosene and FCC gasoline and the like, and more severe emission standard of waste gas from vehicles, the study of the deodorization process of middle distillates or light oils and catalyst therefor have been constantly advancing.

In earlier deodorization processes an acid-base electrochemical refining process was used, but there were some deficiencies of high consumption of acid and base, environmental pollution of acid and base residues, severe corrosion to apparatus and also color-unstability of the product.

A MEROX process without the presence of hydrogen is used as another deodorization process, in which a catalyst of sulfonated phthalocyanine cobalt and an activator are used to oxidize the mercaptan into sulfur dioxide, but the resultant product needs washing, dehydrating with a salt, and then decolorizing with clay. Although the MEROX process is operated under atmospheric pressure, new pollution also occurs from waste salts and wasted clay, and the cost of the sulfonated phthalocyanine cobalt catalyst is also relatively high. Furthermore, there is a severe limitation on the acid value of feedstocks in this process, so the adaptability to feedstocks is not good.

Hydrorefining is an effective measure to remove sulfur (including mercaptan) from oil distillates, but if a conventional hydrorefining process is used, since it is operated at higher temperature and pressure, apparatus investment and energy consumption are all high, thus operation cost goes up. In Table 1 a few sets of process conditions for hydrodesulfurization of aviation kerosene and kerosene fractions are listed (cf. Petroleum Processing No.6, 27–55, 1979, in Chinese).

TABLE 1

| Feed stock | Catalyst | Temperature °C. | Pressure atm. | H/oil volume ratio v/v | LHSV h$^{-1}$ |
|---|---|---|---|---|---|
| Straight kerosene, 150–250° C. | Co—Mo | 300–360 | 30–60 | 50–125 | 3–5 |
| 156–293° C. fraction oil containing sulfur of 0.16% | Co—Mo Aeroh DS-2 | 330 | 23 | 70–90 | 2.3–5.0 |
| 185–288° C. fraction oil containing sulfur of 0.32% | Co—Mo | 345 | 21.8 | 151 | 5.0 |

For oil distillates having qualified or nearly qualified total sulfur content, it is only needed to remove mercaptan and acidic substances from middle distillates by a hydrorefining process under lower pressure. In "Petroleum Processing" No.5, 62–63, 1985, a lower-pressure hydrorefining process of jet fuel fraction is disclosed, a qualified jet fuel can be produced by use of a conventional hydrorefining catalyst from a jet fuel fraction having unqualified indexes of acidity, color and mercaptan content under reaction conditions as follows: hydrogen partial pressure 7–25 kg/cm$^2$, reaction temperature 200–310° C., LHSV 1–8 h$^{-1}$, H$_2$/oil volume ratio 50–200 and hydrogen purity of 60–70%. By use of this technique, the total liquid product yield is about 2% higher than that of acid-base refining while no environmental pollution from acid and base sludges occurs. But, its hydrogen partial pressure in operation is 7–25 kg/cm$^2$, apparatus investment is higher, and since the H/oil volume ratio is also high, when a process of single-pass hydrogen is used, hydrogen consumption is relatively high, especially for a plant short of hydrogen source, thus a bigger apparatus for the circulation of hydrogen is also required.

In U.S. Pat. No. 3,870,626, a hydrotreating process is disclosed for treating a domestic heating raw oil, i.e. #2 straight fraction oil having a total sulfur content of less than 0.2 wt % is treated under relatively low pressure. The process comprises that said straight feedstock oil, which contains at least 30 ppm of mercaptan sulfur, is passed through a hydrotreating catalyst under a process pressure not exceeding 10.2 kg/cm$^2$ and a reaction temperature of 149–315° C., preferably 204–288° C., and with H/oil ratio in the range of 36–216 generally 54–180,wherein the hydrogen consumption including liquid loss does not exceed 25 s.c.f. per barrel of feedstocks; effluent oil with 30 ppm of mercaptan sulfur content is recovered. Said catalyst was used In a hydrotreating process under an operation pressure higher than that used in the inventive process, but said catalyst was deactivated permanently during the hydrotreating process under high pressure. In this process, H/oil volume ratio is in the range of 36–216, generally 54–180.

In U.S. Pat. No. 3,876,532, a hydrotreating process is disclosed for treating a domestic heating raw oil, i.e. #2 straight fraction oil having a total sulfur content of less than 0.2 wt % under relatively low pressure. The process comprises that said oil is passed through a hydrotreating catalyst, the total acid value of said straight feedstock oil is higher than 0.1(measured by ASTM D66C or D974), said process pressure is not higher than 10.2 kg/cm$^2$, reaction temperature is 149–315° C., preferably 204–288° C., hydrogen consumption including liquid loss is not higher than 25 s.c.f. per barrel of feedstocks; effluent oil having a total acid value of less than 0.1 is recovered. In this process, H/oil volume ratio is in the range of 36–216, generally 54–180.

In U.S. Pat. No. 3,850,744, a hydrotreating process under relatively low pressure is disclosed, which is carried out in the first reactor under relatively low pressure. The process comprises that the first feedstock containing straight middle fraction oil and hydrogen is passed downward through a hydrodesulfurization catalyst which has been deactivated in the preceding hydrodesulfurization process under relatively high pressure, said preceding process is carried out in a second reactor having relatively high pressure in downflow mode by using the second feedstock under a pressure of at least 40.8 kg/cm$^2$ and a temperature of 343–427° C. When said catalyst has lost permanently the necessary activity for the high-pressure hydrodesulfurization, said catalyst is removed from the second reactor and packed into the first relatively low pressure reactor for hydrotreating the first feedstock under the conditions of a pressure not higher than 10.2 kg/cm$^2$ and the reaction temperature in the range of 149–315° C., preferably 204–288° C. When his process is used, the H/oil volume ratio is 36–216, generally 54–180, in said first reactor.

In the prior art, the reaction temperature of hydrodesulfurization is 149–315° C., preferably 204–288° C., whereas a relatively high temperature will lead to an increase in energy consumption and cost of the process. The reason why such a high reaction temperature of 204–288° C. is preferred in the prior art is that the existing catalyst of prior art has not enough low-temperature activity at a temperature below 200° C., it cannot effect demercaptanization to a deeper extent and its reaction product can not meet the quality requirements.

In hydrodemercaptanization process, the hydrogenation catalysts play an important role in the process. First of all, the catalyst cost is directly related to the operation cost of the whole hydrogenation process. Therefore, during the treatment of qualified or nearly qualified middle fractions which are only required to remove mercaptan and acidic substances, the catalysts should have higher activities of hydrodemercaptanization and deacidification, at the same time the cost of the catalysts should be lower. In addition, in order to reduce investment and operation cost for the hydrorefining process, the low-temperature (150–200° C.) activity of the catalyst is of very important significance, the catalyst having higher activity at low temperature can not only reduce energy consumption in the hydrorefining process, but also have an important effect on the process scheme. For example, the atmospheric first side-line kerosene (hot) (that is the reaction feedstock used in the present invention) Is generally at about 160–180° C. when it is just distilled out from a distillation apparatus, if the hydrodemercaptanization of said oil product is carried out at the reaction temperature of hydrofining process below 200° C. the feedstock can be heated to the reaction temperature required only by passing through a simple heat exchanger, and steam of medium pressure (15 kg/cm$^2$) can be used as a heating medium, or even the feedstock can be fed directly into the hydrodemercaptanization apparatus without any heat exchanger to enter into the hydrodemercaptanization reaction. When the reaction temperature of the hydrofining process is at 240° C. or higher, steam of high pressure (up to 35 kg/cm$^2$) must be used as a heat-exchange medium so that the feedstock can be heated to the reaction temperature required. However, all the catalysts of prior art have higher metal content and their low-temperature activity is inferior.

Furthermore, in the view of existing hydrogenation theory it is believed that the H/oil volume ratio must be maintained at a high level for the hydrodemercaptanization reaction, thus a minimum value of the H/oil volume ratio is prescribed for the hydrogenation process In prior art, for example in U.S. Pat. No. 3,870,626, U.S. Pat. No. 3,876,532, U.S. Pat. No. 3,850,744, the prescribed minimum value of the H/oil volume ratio is 36, preferred minimum value is 54, however in practical application it is in general higher than 50. Such high H/oil volume ratio will result obviously in an enormous waste of hydrogen in a process in which a single-pass hydrogen flow (i.e. no circulating hydrogen for reuse) is adopted.

In view of this, the flow scheme shown in FIG. 1 is generally used in the prior art (see "Petroleum Processing" No.6, 27–55,1979). That is, the feedstock is mixed via line 1 with hydrogen from line 2, then flows to a heater 3 (or a heat exchanger), the heated feedstock is fed via line 4 into a hydrogenation reactor 5 in which a hydrorefining catalyst is packed. The reaction between the feedstock and hydrogen is carried out in the reactor 5 in contact with the hydrofining catalyst. Reaction product Is fed via line 6 in a cooler 7 to be cooled. The cooled reaction product enters in a separator 9 via line 8, where unreacted hydrogen and part of hydrogen sulfide gas are separated out, then discharged via line 10, wherein the hydrogen via line 11 and circulating-hydrogen compressor 12 is mixed with hydrogen from hydrogen compressor 13, then enters line 2. Hydrogen sulfide gas is discharged from line 14. The reaction product from which unreacted hydrogen and part of hydrogen sulfide gas have been separated flows to a stripper 16 via line 15, where the remaining hydrogen sulfide gas and part of lower hydrocarbons are stripped out off and discharged via line 17. The reaction product from which hydrogen sulfide gas and part of lower hydrocarbons have been stripped off then flows into a cooler 19 via line 18. The cooled reaction product then flows out via line 20 to obtain a qualified product.

In the prior art, the process with single-pass hydrogen flow shown in FIG. 2 is also in use (see "Petroleum Processing" No.6, 27–55, 1979). That is the feedstock is mixed via line 1 with hydrogen from line 2, then flows to a heater 3, the heated feedstock is fed via line 4 into a hydrogenation reactor 5 in which a hydrorefining catalyst is packed. The reaction between the feedstock and hydrogen is carried out in the reactor 5 in contact with the hydrorefining catalyst. Reaction product flows to a cooler 7 via line 6 to be cooled. The cooled reaction product enters in a high-pressure separator 9 via line 8, where unreacted hydrogen and part of gaseous hydrogen sulfide are separated out, then discharged via line 10. The reaction product from which unreacted hydrogen and part of hydrogen sulfide gas have been separated our flows to a stripper 16 via line 15, where the remaining hydrogen sulfide gas and part of lower hydrocarbons are stripped off, then discharged via line 17. The reaction product from which hydrogen sulfide gas and past of lower hydrocarbons are stripped off flows into a cooler 19 via line 18. Cooled reaction product flows out via line 20, then a qualified product is obtained.

However, in the prior art, the H/oil volume ratios of said processes are all higher than 36, while in practical application they are higher than 50, therefore, if a process with single-pass hydrogen flow is used, there will be a serious waste of hydrogen. In addition, as the H/oil volume ratios used in said processes of prior art are higher, the pressure sometime is also high, so product must be separated in a separator after reaction ( see ref sign 9 shown in FIGS. 1 and 2).

The object of the present invention is to provide a hydrocarbon conversion process to overcome the above drawbacks in the prior art, wherein the process comprises at least a hydrodemercaptanization process which can be carried out at lower reaction temperature, especially at lower temperature and lower H/oil volume ratio.

As mentioned above, the hydrotreating catalysts of prior art have inferior activity at low-temperature, and most of them have also higher metal content and higher cost. The inventors of the present invention discover unexpectedly that,by introducing three active components of nickel, cobalt and molybdenum and/or tungsten onto the alumina carrier of the catalyst and adjusting the ratio of the three components, the metal content of the catalyst is decreased, while the low-temperature activity of the catalyst can be significantly increased. Especially, the low-temperature activity can be further improved by use of a specific method for preparation of the catalyst.

The process of hydrocarbon conversion according to the present invention comprises at least a hydrodemercaptanization process comprising use of a feedstock having a total sulfur content not higher than 0.35 wt %, mercaptan sulfur content higher than 20 ppm in contact with a hydrofining catalyst under the conditions of hydrodemercaptanization process, and recovery of a product having a decreased content of mercaptan sulfur, wherein said process conditions of hydrodemercaptanization include a H/oil volume ratio not less than 5, said hydrofining catalyst contains tungsten oxide and/or molybdenum oxide, nickel oxide and cobalt oxide supported on an alumina carrier, in which, based on the weight of the catalyst, the content of said tungsten oxide and/or molybdenum oxide is from 4 wt % to less than 10 wt %, the content of nickel oxide is 1–5 wt %, the content of cobalt oxide is 0.01–1 wt % and the ratio of the total atom number of nickel and cobalt to the total atom number of nickel, cobalt, tungsten and /or molybdenum is 0.3–0.9.

In said hydrofining catalyst according to the invention, the content of nickel oxide is preferably 2–4 wt %; the content of cobalt oxide is preferably 0.02–0.5 wt %; the content of tungsten oxide and/or molybdenum oxide is preferably 4.5–9 wt %; and said ratio of total atom number of nickel and cobalt to total atom number of nickel, cobalt, tungsten and/or molybdenum is preferably 0.4–0.7.

The catalyst used in the process according to the present invention can comprise further and preferably one promoter. Said promoter can be selected from one or more of the oxides of magnesium, oxides of phosphorus and fluorine-containing compounds, and the content of said promoter is 0.01–8 wt %, preferably 0.2–5 wt %, based on element.

Said alumina carrier is an alumina often used as a carrier of hydrogenation catalysts, preferably γ-alumina, η-alumina or mixture thereof. More preferably, the alumina carrier is γ-alumina or an alumina essentially consisted of γ-alumina.

Although the pre-sulfurization of said hydrofining catalyst according to the invention can be carried out before use, the best way is not to do so, the catalyst in an oxidation state can be directly used to start operation.

The catalyst used in the process according to the present invention can be prepared by co-impregnation technique, that is, the alumina carrier is impregnated with an aqueous solution containing tungsten and/or molybdenum, nickel and cobalt compounds, then calcined to obtain the catalyst.

The preferred preparation method of the catalyst used in the process according to the invention comprises that the alumina carrier is impregnated with an aqueous solution containing molybdenum and/or tungsten compounds and a nickel compound, and an aqueous solution containing a cobalt compound, and the alumina carrier impregnated with molybdenum and/or tungsten, nickel and cobalt is calcined, wherein said impregnation process of the alumina carrier with the aqueous solution containing cobalt compound and said impregnation process of the alumina carrier with the aqueous solution containing molybdenum and/or tungsten compounds and nickel compound are carried out separately. Said impregnation process of the alumina carrier with the aqueous solution of the cobalt compound is carried out after the alumina carrier has been impregnated with the aqueous solution containing molybdenum and/or tungsten compound the nickel compound and calcined. Said calcination temperature of the alumina carrier impregnated with the aqueous solution of cobalt compound is in the range of 50–300° C., and said calcination time is more than 1 hour. The low-temperature activity of the hydrofining catalyst prepared by using said method can be further strengthened.

The preferred preparation method of the catalyst used in the process according to the present invention comprises preferably the following specific steps:

(1). A precursor of alumina is shaped, then dried, and calcined at 500–700° C. in presence of air or steam for 1–6 hours to obtain an alumina carrier (2). The resultant alumina carrier from step (1) is impregnated with an aqueous solution containing molybdenum and/or tungsten and nickel compounds, then dried and calcined, wherein the amount of molybdenum and/or tungsten and nickel compounds used should be enough to obtain the final catalyst containing from 4 wt % to less than 10 wt %, preferably 4.5–9 wt % of tungsten oxide and/or molybdenum oxide, and 1–5 wt %, preferably 2–4 wt % of nickel oxide;

(3). The resultant product from step (2) is impregnated with an aqueous solution containing cobalt compound, then calcined at 50–300° C., preferably 150–250° C. for more than 1 hour, preferably for 2–4 hours. wherein the amount of cobalt compound used should be enough to obtain the final catalyst containing 0.01–1 wt %, preferably 0.02–0.5 wt % of cobalt oxide.

Said precursor of alumina can be selected from various hydrated alumina such as pseudo-boehmite, gibbsite and the like, which can be calcined to form γ-alumina and/or η-alumina. Said precursor of alumina is preferably pseudo-boehmite or one or more hydrated alumina being consisting essentially of pseudo-boehmite.

Wherein said drying and calcination of the alumina carrier impregnated with the aqueous solution containing molybdenum and/or tungsten and nickel compounds are carried out under conventional conditions. For example the dry temperature may be in the range from room temperature to 200° C., the calcination temperature may be in the range from 400° C. to 600° C. and calcination time may be more than 1 hour, preferably 2–5 hours.

A conventional impregnation or saturation impregnation method can be used for said impregnation, the saturation impregnation method is preferred.

Said molybdenum and/or tungsten compounds are selected from one or more of their water soluble compounds, preferably ammonium tungstate, ammonium metatungstate and/or ammonium molybdate. Said nickel compounds can be selected from its water soluble nitrate, acetate, carbonate and basic carbonate, preferably nickel nitrate and/or nickel acetate. Said cobalt compounds can be selected from its water-soluble nitrate, acetate, carbonate and basic carbonate, preferably cobalt nitrate and/or cobalt acetate.

The preparation method of the hydrorefining catalyst used in the process provided according to the present invention can comprise also steps of impregnation of said alumina carrier with one or more kinds of aqueous solutions containing magnesium, phosphorus and fluorine compounds, wherein said impregnation is carried out before the alumina carrier is impregnated with the aqueous solution containing molybdenum and/or tungsten compounds and nickel compound; after the Impregnation, the resultant carrier is then dried and calcined. The conditions for drying and calcination are the same as those after impregnation with molybdenum and/or tungsten and nickel. The amount of said magnesium, phosphorus and fluorine compounds and their aqueous solutions used should reach such a sufficient extent that the final catalyst obtained contains 0.01–8 wt %, preferably 0.2–wt % of magnesium, phosphor and/or fluorine, calculated as element.

The magnesium, phosphorus and/or fluorine compounds can be selected from one or more of their water soluble compounds, wherein the magnesium compound is preferably magnesium nitrate, the fluorine compound is preferably ammonium fluoride and/or fluorohydric acid, and the phosphorous compound is preferably one or more kinds of phosphoric acid, ammonium phosphate and ammonium dihydrogen phosphate, ammonium monohydrogen phosphate.

According to the process of the present invention, said process conditions for hydrodemercaptanization can be conventional process conditions of hydrodemercaptanization, for example, reaction temperature 149–315° C. reaction pressure 0.3–1.5 MPa, preferably 0.3–0.7 MPa, LHSV 0.5–10 h$^{-1}$, preferably 1–8 $^{-1}$.

As the catalyst used in the process provided according to the invention has good low-temperature activity, said reaction temperature is preferably 150–260° C., more preferably 150–200° C.

Using the catalyst provided according to the present invention, the hydrodemercaptanization of feedstocks can be carried out under the condition of conventional H/oil volume ratio, i.e. a H/oil volume ratio of 36–216, and also can be carried out under the range of H/oil volume ratio lower than that used in the prior art, namely in the range from not less than 5 to less than 36. In consideration of economical factors, the H/oil volume ratio in the process according to the present invention is preferably 5–30.

The lower the reaction pressure the better it is, only if said reaction pressure is able to promote the reaction feedstock flowing at an appropriate velocity forward.

The process according to the present invention is illustrated in combination with the following drawings.

In said hydrodemercaptanization of the process according to the present invention, the flow scheme shown in FIG. 1 can be used: the feedstock is mixed via line 1 with hydrogen from line 2, then flows to a heater ( 3 or heat exchanger), the heated feedstock is fed via line 4 to a hydrogenation reactor 5 in which a hydrofining catalyst is packed. The reaction between the feedstock and hydrogen in contact with the hydrofining catalyst is carried out in the reactor 5. Reaction product flows into a cooler 7 via line 6,to be cooling. After cooled the reaction product enters in a separator 9 via line 8, where unreacted hydrogen and part of hydrogen sulfide gas are separated out and then discharged via line 10, wherein the hydrogen is mixed via line 11 through a hydrogen-circulating compressor 12 with hydrogen from a hydrogen compressor 13, then enters line 2, and hydrogen sulfide gas is discharged from line 14. The reaction product from which unreacted hydrogen and part of hydrogen sulfide gas have been separated flows via line 15 to a stripper 16, where the remaining hydrogen sulfide gas and part of lower hydrocarbons are stripped off, and then discharged via line 17. The reaction product from which hydrogen sulfide gas and part of lower hydrocarbons have been stripped off flows to a cooler 19 via line 18. After cooling, the reaction product flows out via line 20, then a qualified product is obtained.

In said hydrodemercaptanization of the process according to the present invention, the flow scheme shown in FIG. 2 is preferably used: the feedstock is mixed via line 1 with hydrogen from line 2, then flows to a heater ( 3 or heat exchanger), the heated feedstock is fed via line 4 into a hydrogenation reactor 5 in which a hydrofining catalyst is packed. The reaction between the feedstock and hydrogen in contact with the hydrofining catalyst is carried out in the reactor 5. Reaction product flows into a cooler 7 via line 6 to be cooling. After cooled, the reaction product enters in a separator 9 via line 8, where unreacted hydrogen and part of hydrogen sulfide gas are separated out and then discharged via line 10,. The reaction product from which unreacted hydrogen and part of hydrogen sulfide gas have been separated flows to a stripper 16 via line 15, where the remaining hydrogen sulfide gas and part of lower hydrocarbons are stripped off, and discharged via line 17. The reaction product from which hydrogen sulfide gas and part of lower hydrocarbons have been stripped off flows to a cooler 19 via line 18. The cooled reaction product flows out via line 20, then a qualified product is obtained.

In hydrodemercaptanization of the process according to the present invention, the flow scheme shown in FIG. 3 is more preferably used: The feedstock is mixed via line 1 with hydrogen from line 2, then flows to a heater( 3 or heat exchanger), the heated feedstock is fed via line 4 into a hydrogenation reactor 5 in which a hydrorefining catalyst is packed. The reaction between the feedstock and hydrogen in contact with the hydrorefining catalyst is carried out in the reactor 5. Reaction product flows via line 6 directly to a stripper 16, where the unreacted hydrogen, hydrogen sulfide gas and part of lower hydrocarbons are separated out, and discharged via line 17, then the reaction product from which unreacted hydrogen sulfide gas and part of lower hydrocarbons have been stripped off flows to a cooler 19 via line 18. The cooled reaction product flows out via line 20, then a qualified product is obtained.

The hydrogen may be pure hydrogen, or the hydrogen may be mixed with other inert gases; said inert gases refer to those which will not affect the hydrodemercaptanization reaction. Said inert gases may be, for example, nitrogen, argon, gaseous alkanes and the like. The hydrogen may be fresh industrial hydrogen ( with a purity of 85–100 wt %), industrial exhaust hydrogen ( with a purity of 50–80%), or hydrogen discharged from synthetic ammonia unit and so on, in which the oxygen content should be not higher than 5 ppm,and hydrogen sulfide content not higher than 2 wt %.

The process according to the present invention is suitable for hydrodemercaptanization of the feedstocks having a total sulfur content not higher than 0.35 wt % and mercaptan sulfur content higher than 20 ppm. Said feedstocks may be various distillates, preferably middle fractions or light oils, such as lamp kerosene, aviation kerosene, FCC gasoline and so on. The process according to the present invention has also very strong function of deacidification, which can be carried out simultaneously for the feedstocks having an acid value not less than 0.015 mg KOH/ g, so the feedstock oils are allowed to contain acidic substances.

The hydrodemercaptanization process comprised in the process according to the present invention can exist independently. For said hydrodemercaptanization, the feedstocks can be obtained by various existing methods, for example, kerosene from atmosphere distillation or thermal cracking, and FCC gasoline from catalytic cracking. The hydrodemercaptanization process said in the present invention can be used independently.

The catalyst used in the process provided according to the present invention has good low-temperature activity, thus the process according to the invention can be carried out at lower temperature, therefore, upstream of the hydrodemercaptanization process according to the invention may comprise a process for preparing a hydrodemercaptanization feedstock, such as catalytic cracking, atmosphere distillation of crude oil, or thermal cracking of heavy oils, so that the reaction products obtained from the atmosphere distillation of crude oils, thermal cracking or catalytic cracking of heavy oils can be directly used as a feedstock oil for hydrodemercaptanization, or used only after being passed through a simple heat-exchange apparatus.

Said catalytic cracking process comprises contacting a catalytic cracking feedstock with a catalytic cracking catalyst under catalytic cracking conditions, and separating said feedstock used for hydrodemercaptanization.

As a preferred technical solution, the present invention can be performed according to the flow scheme shown in FIG. 4: The catalytic cracking feedstock is mixed via line 21 with a recycle oil from line 22 in the recycle ratio of 0.2–3, then flows to a heater 24 via line 23 to be heated to 300–400°

C. The heated feedstock oil is mixed via line 25 with oil slurry from fractionation tower bottom(the oil slurry from the fractionation tower bottom ammounts to about 8–25 wt % of fresh feedstock)via line 26, and flows to a riser reactor 28 together with steam from line 27(with pressure grade in general 10 kg/cm$^2$) in an oil/steam weight ratio of 80–120, in the riser reactor 28 further mixed with the catalytic cracking catalyst having a temperature of 550–620° C. from line 32, where the catalytic reaction is carried out, then the reaction product together with the catalyst enter in a settler 29, where the catalyst and reaction product are separated. The catalyst flows to a regenerator 31 via line 30, in the regenerator 31 the catalyst is regenerated (at a regeneration temperature 650–750° C.), the regenerated catalyst flows to the riser reactor via line 32. The reaction product enters into a fractionation tower 34 via line 33 (the operation conditions of the fractionation tower are in general: operation pressure 0.06–0.1 MPa, top temperature of the tower 110–130° C., bottom temperature of the tower 360–380° C.), in the fractionation tower 34, light diesel, heavy diesel, recycle oil, bottom oil slurry and top effluent are separated out, wherein the light diesel is discharged off via line 35, the heavy diesel is discharged off via line 36. The recycle oil enters in a recycle oil storage 38 via line 37 and then is mixed via line 22 with catalytic cracking feedstock from line 21, the bottom oil slurry is mixed via line 26 with heated mixture of the catalytic cracking feedstock and the recycle oil from line 25. The top effluent flows to a cooling system 40 via line 39, after cooled to 50–70° C., the top effluent enters in an oil/gas separator 42 via line 41, waste water is stored in a tank 43, then discharged via line 44. Naphtha and rich gas flow to a absorption tower 47 via line 45 and line 46 respectively, where the absorption is carried out in downward inverse flow mode under about 1–1.5 MPa and 30–50° C. to separate out dry gas and dethanized gasoline. The dry gas is discharged from the top via line 48. The dethanized gasoline flows into a rectification tower 50 via line 49, the rectification tower 50 is operated in general under 0.5–1.5 MPa, top temperature 50–60° C., bottom temperature 160–170° C. to separate liquefied gas and bottom product. The liquefied gas enters into a top reflux tank 52 via line 51, part of which is refluxed to the rectification tower 50 via line 53(in a reflux ratio of generally 1–4), another part of the liquefied gas is discharged via line 54. A part of bottom product enters into a bottom reboiler 57 via lines 55 and 56 with the provision that the height of the liquid level is 50–70% of that of the tower and then is refluxed to the rectification tower 50 via line 58. Another part of the bottom product (i.e. FCC gasoline, feedstock oil for hydrodemercaptanization having, in general a distillation range of 39–210° C., total sulfur content not greater than 0.35 wt %, mercaptan sulfur content higher than 20 ppm) is mixed via line 1 with the hydrogen from line 2 in a H/oil volume ratio greater than 5, preferably 5–30, then enters in heat exchanger 3, then the mixture of feedstock and the hydrogen, being heated (or not heated)to 149–315° C., preferably 150–260° C., more preferably 150–200° C., enters via line 4 in the hydrogenation reactor 5 packed with a hydrofining catalyst. In the reactor 5, the feedstock and hydrogen in contact with the hydrofining catalyst enter into reaction under conditions of: reaction temperature of 149–315° C., preferably 150–260° C., more preferably 150–200° C. and reaction pressure 0.3–1.5 MPa, preferably 0.3–0.7 MPa, and LHSV 0.5–10 h$^{-1}$, preferably 1–8 h$^{-1}$. The reaction product flows directly into a stripper 16 via line 6, where the unreacted hydrogen, hydrogen sulfide gas and part of lower hydrocarbons are separated out and discharged via line 17. The reaction product from which unreacted hydrogen, hydrogen sulfide gas and part of lower hydrocarbons have been separated flows to a cooler 19 via line 18. The cooled reaction product flows out via line 20, then a qualified product is obtained.

Wherein the catalytic cracking feedstock may be various existing catalytic cracking feedstocks, such as atmosphere residual oils, mixed oils of vacuum wax oils and vacuum residua, mixed oils of vacuum wax oils and coking wax oils and the like.

Said catalytic cracking catalyst may be any of various catalytic cracking catalysts, preferably one which comprises zeolite, especially faujusites such as HY, USY(ultra-stable Y), REY(rare-earth Y), REUSY(rare earth ultra-stable Y ), HX, REX zeolites as active constituents. The carrier of the catalyst may be a full synthetic or partial synthetic catalyst carrier. Various catalytic cracking catalysts and the preparation thereof are seen in the following references: CN 1,005,385B, CN 1,005,386B, CN 1,057,408, CN 1,034, 718C, CN 1,026,217 C, CN 1,024,504C, JP 62-212,219, JP 63-270,545, JP 63-278, 553, JP 60–224, 428, EP 358,261, EP 397,183, EP252,761, U.S. Pat. No. 3,676,368, U.S. Pat. No. 4,454,241, U.S. Pat. No. 4,465,780, U.S. Pat. No. 4,504,382, U.S. Pat. No. 4,977,622, U.S. Pat. No. 4,218,307, U.S. Pat. No. 4,839,319, U.S. Pat. No. 4,567,152, U.S. Pat. No. 4,584,091, U.S. Pat. No. 4,010,116, U.S. Pat. No. 4,325,845, U.S. Pat. No. 4,325,847, U.S. Pat. No. 4,206,085, U.S. Pat. No. 4,542,118, etc.,.

Said atmosphere distillation process of crude oil comprises steps of distilling crude oil under conventional conditions of atmosphere pressure and separating out feedstock oil for hydrodemercaptanization. Said hydrodemercapanization feedstock may be, for example, an atmospheric first side-line kerosene from atmosphere distillation.

Said thermal cracking process of heavy oils comprises steps of cracking thermally heavy oils under conventional thermal cracking conditions, and separating out the feedstock for hydrodemercaptanization. Said feedstock of hydrodemercaptanization may be, for example, an atmospheric first side-line kerosene from atmosphere distillation. Said thermal cracking feedstocks are namely heavy oils including various conventional thermal cracking feedstocks, such as atmosphere residual oils, vacuum residua, deasphalted vacuum residua and vacuum gas oils, etc.

As another preferred technical solution, this invention can be performed according to the flow scheme shown In FIG. 5: Crude oil is pumped via line 60 to a heat exchanger 61 a pump 59, and is heated to 50–100° C. The heated crude oil flows to a desalt-dewatering tank 63 via line 62. The waste water produced is stored in a waste water tank 64 and discharged. After salt and water are removed, the crude oil is fed into a heat exchanger 66 via line 65 and heated to 210–300° C. The heated crude oil enters into a pre-fractionation tower 68 (operation condition in general are: operation pressure 0.16–0.20 MPa, inlet temperature 250–270° C.) via line 67, top gasoline of the pre-fractionation tower is discharged via line 69, bottom product of the pre-fractionation tower or heavy feedstock oil from thermal cracking (for thermal cracking process of a heavy oil, the desalt-dewatering process and the process of pre-fractionation mentioned above may be omitted) from line 70 enters pump 71 and is pumped via by pump 71 via line 72 to a heater 73 and in which the temperature is 360–380° C. (for atmosphere distillation) or 400–510° C.(for thermal cracking ). Then the heated bottom product of the pre-fractionation tower enters in an atmosphere distillation tower 75 via line 74 (operation condition in general are: operation pressure 0.16–0.20 MPa, inlet temperature 360–510° C.). The atmospheric first side-line draw oil, product of the distillation or thermal cracking product flows to an atmosphere first side-line stripper 77 via line 76 (operation conditions in general are: operation pressure 0.22–0.26 MPA, bottom temperature 210–240° C.), and the recycle oil of the atmospheric first side-line stripper turns back to the atmosphere distillation tower 75 via line 78. The atmospheric second side-line oil draw from atmosphere distillation tower enters in a atmospheric second side-line stripper 80 (operation condition in general are: operation pressure 0.22–0.26 MPA, bottom temperature 280–300° C.) via line 79, the recycle oil of the atmospheric second side-line stripper turns back to the atmosphere distillation tower 75 via line 81. The atmospheric third side-line oil draw from atmosphere distillation tower enters into a atmospheric third side-line stripper 83 (operation conditions in general are: operation pressure 0.22–0.26 MPa, bottom temperature 360–390° C.) via line 82, the recycle oil of the atmosphere third side-line stripper turns back to the atmosphere distillation tower 75 via line 84. The bottom residual oil of the atmosphere distillation tower is discharged via line 85. The atmosphere second side-line product, i.e. light diesel, of the atmospheric second side-line stripper is discharged via line 86. The atmosphere third side-line product, i.e. heavy diesel, of the atmospheric third side-line stripper is discharged via line 87. The product of atmospheric first side-line stripper, i.e. the atmospheric first side-line kerosene (having generally a distillation range of 30–290° C., a total sulfur content not higher than 0.35 wt %, and mercaptan sulfur content higher than 20 ppm) is mixed via line 1 with hydrogen from line 2 in a H/oil volume ratio greater than 5, preferably 5–30, then enters in a heat exchanger 3, then the feedstock heated (or not heated )to 149–315° C., preferably 150–260° C., more preferably 150–200° C. enters via line 4 in a hydrogenation reactor 5 packed with a hydrofining catalyst, in which the feedstock and hydrogen in contact with the hydrofining catalyst enter into reaction under conditions of : reaction temperature 149–315° C., preferably 160–260° C., more preferably 150–200° C. and reaction pressure 0.3–1.5 MPa, preferably 0.3–0.7 MPa, and the LHSV 0.5–10 h$^{-1}$, preferably 1–8 h$^{-1}$. The reaction product flows directly into a stripper 16 via line 6, where the unreacted hydrogen, hydrogen sulfide gas and part of lower hydrocarbons are separated out and discharged via line 17, then the reaction products from which unreacted hydrogen, hydrogen sulfide gas and part of lower hydrocarbons have been separated flows to a cooler 19 via line 18. The cooled reaction product flows out via line 20, then a qualified product is obtained.

Since a special hydrorefining catalyst is used, the demercaptanization of the process provided according to the present invention can be unexpectedly carried out at lower temperature (150–200° C.). Moreover, at such a lower reaction temperature the mercaptan sulfur content of the product is relatively low. Especially, said demercaptanization of the process provided according to the present invention can be unexpectedly operated under conditions of lower temperature and a very low H/oil volume ratio (5–30), moreover, excellent result of hydrodemercaptanization has been achieved. For example, according to the process of the present invention, the hydrodemercaptanization of aviation kerosene having a total sulfur content of 2170 ppm, mercaptan sulfur content of 128 ppm, acid value of 0.039 mg KOH/g is carried out under the condition of reaction temperature of 160–200° C. and a H/oil volume ratio of 5–30, the total sulfur content, mercaptan sulfur content and acid value are decreased to less than 2000 ppm, less than 20 ppm, and 0.01 mg KOH/g respectively in the product obtained, and the product meets the quality requirements for 3# aviation kerosene. But, with the catalysts of prior art, the demercaptanization of the same feedstock is carried out under the condition of such a low reaction temperature and low H$_2$/oil volume ratio, at least one of the indexes of total sulfur content, mercaptan sulfur content and acid value of the products fail to meet the quality requirements for 3# aviation kerosene.

As the demercaptanization process of a feedstock according to the present invention can be carried out at very low H/oil volume ratio, if the flow scheme shown in FIG. 1 is used, the hydrogen-circulating amount can be significantly lower than that of the processes of prior art, thus a smaller compressor for circulating hydrogen can be used. If the flow scheme shown in FIG. 2 is used, the circulating hydrogen system can be omitted , so the apparatus investment can be greatly reduced, since the H/oil volume ratio can be lower, even the single-pass hydrogen process can be used, the hydrogen-circulating amount can be significantly lower than that of previous processes, and a great quantity of hydrogen can be saved compared with the single-pass hydrogen process in the prior art. Surprisingly , the flow scheme shown in FIG. 3 can be used according to the present invention, this is what can not be done by any one of the prior arts. This is because in the prior art the H/oil volume ratio is higher so as to reduce the load of stripper 16, and consequently the separator 9 is indispensable. Hence, the process according to the present invention has incomparable advantages over the prior arts.

Since said demercaptanization process provided according to the present invention can be carried out at lower temperature, where said hydrodemercaptanization process is used in combination with a catalytic cracking and atmosphere distillation of crude oil or thermal cracking of heavy oils operated according to the Dow schemes shown in FIG. 4 or FIG. 5, the cooling step and apparatus required for products of catalytic cracking and atmosphere distillation of crude oil or thermal cracking of heavy oils can be not only saved but also their products can be fed directly or through a simple heat exchange unit into the demercaptanization apparatus, so that energy consumption is decreased. Furthermore the corresponding storing steps and apparatuses for storage of products can also be saved, thus apparatus investment thereof is decreased, finally the cost of qualified product can be sharply reduced.

The pressure for said hydrodemercaptanization in the process provided according to the present invention is not higher than 1.5 MPa, preferably 0.3–0.7 MPa, under such a low reaction temperature and H/oil volume ratio, even so low pressure can be used, and apparatus investment requirement Is very low, the investment cost even can be cut down to the level for a hydrogenation process without presence of hydrogen.

The metal content of catalyst for hydrodemercaptanization used in the process according to the invention is much lower than that of the catalysts used in the prior art, but the low-temperature activity of catalyst for hydrodemercaptanization used in the process according to the invention is obviously far superior to that of the catalyst used in the prior art, this is an important advantage of the present invention. For example, according to the process of the present invention, by using a catalyst comprising 0.05–0.26 wt % of cobalt oxide, 2.05–3.51 wt % of nickel oxide, 6.06–8.50 wt % of tungsten oxide or molybdenum oxide, the hydrodemercaptanization of an aviation kerosene with a distillation range of 161–220° C. having total sulfur content of 2170 ppm, mercaptan sulfur content of 128 ppm, acid value of 0.039 mg KOH/g is carried out under the conditions of reaction temperature of 180° C. and 200° C. respectively, hydrogen partial pressure of 0.7 MPa, LHSV of 4.0 h$^{-1}$ and H/oil volume ratio of 5–30, the mercaptan sulfur contents of products are all less than 16 ppm, and acid values are less than 0.009 mg KOH/g, they all meet the quality requirements for 3# aviation kerosene: the mercaptan sulfur content of product be less than 20 ppm, and acid value be less than 0.015 mg KOH/g. Especially, the catalysts prepared by the method of post-impregnation of cobalt have much higher low-temperature activity, furthermore, the catalysts prepared by the method of post-impregnation of cobalt and comprising a promoter containing magnesium, phosphorus or fluorine at the same time show the highest low-temperature activity.

EXAMPLES

Figure 1:
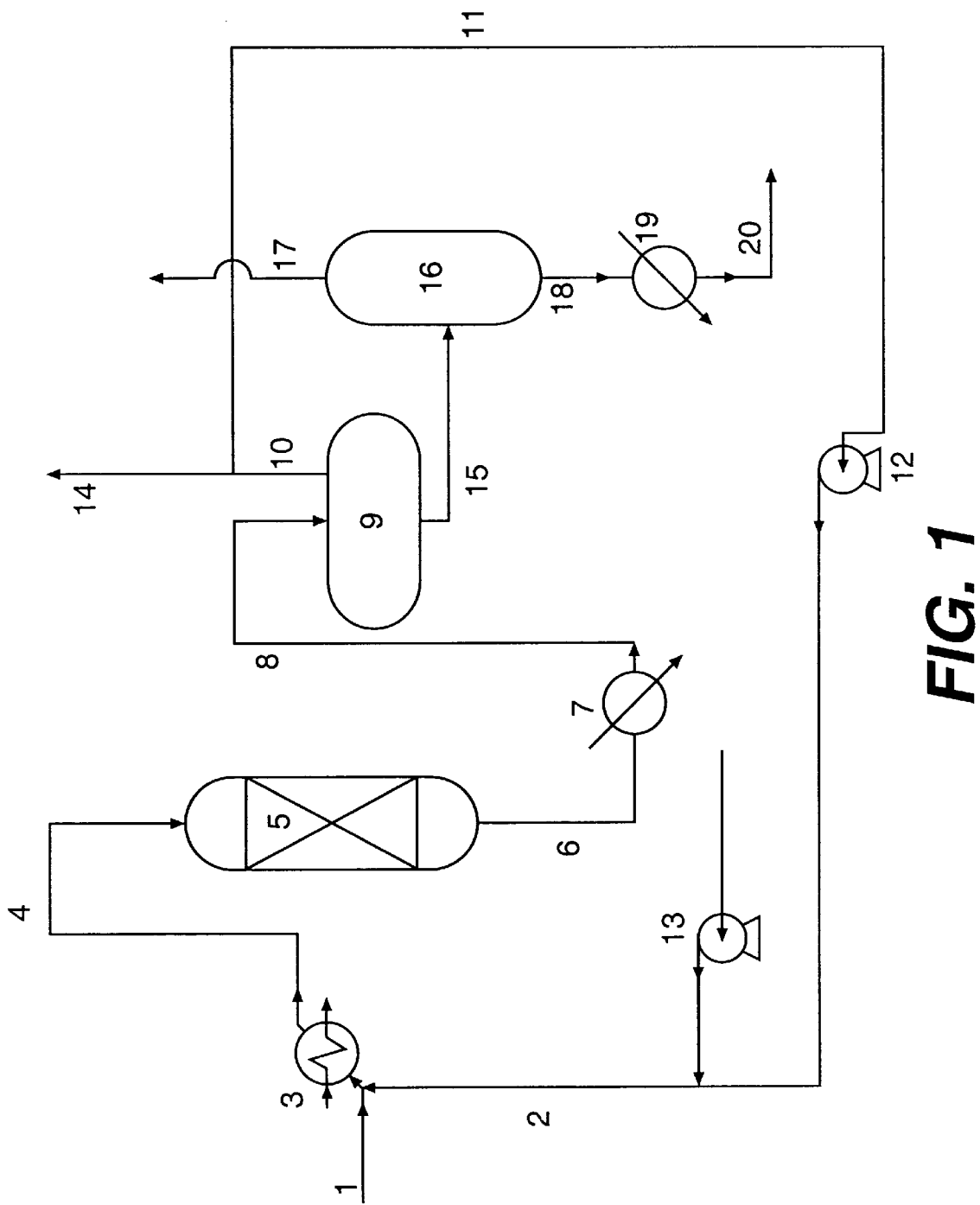
FIG. 1 is the first flow scheme according to the present invention.
Figure 2:
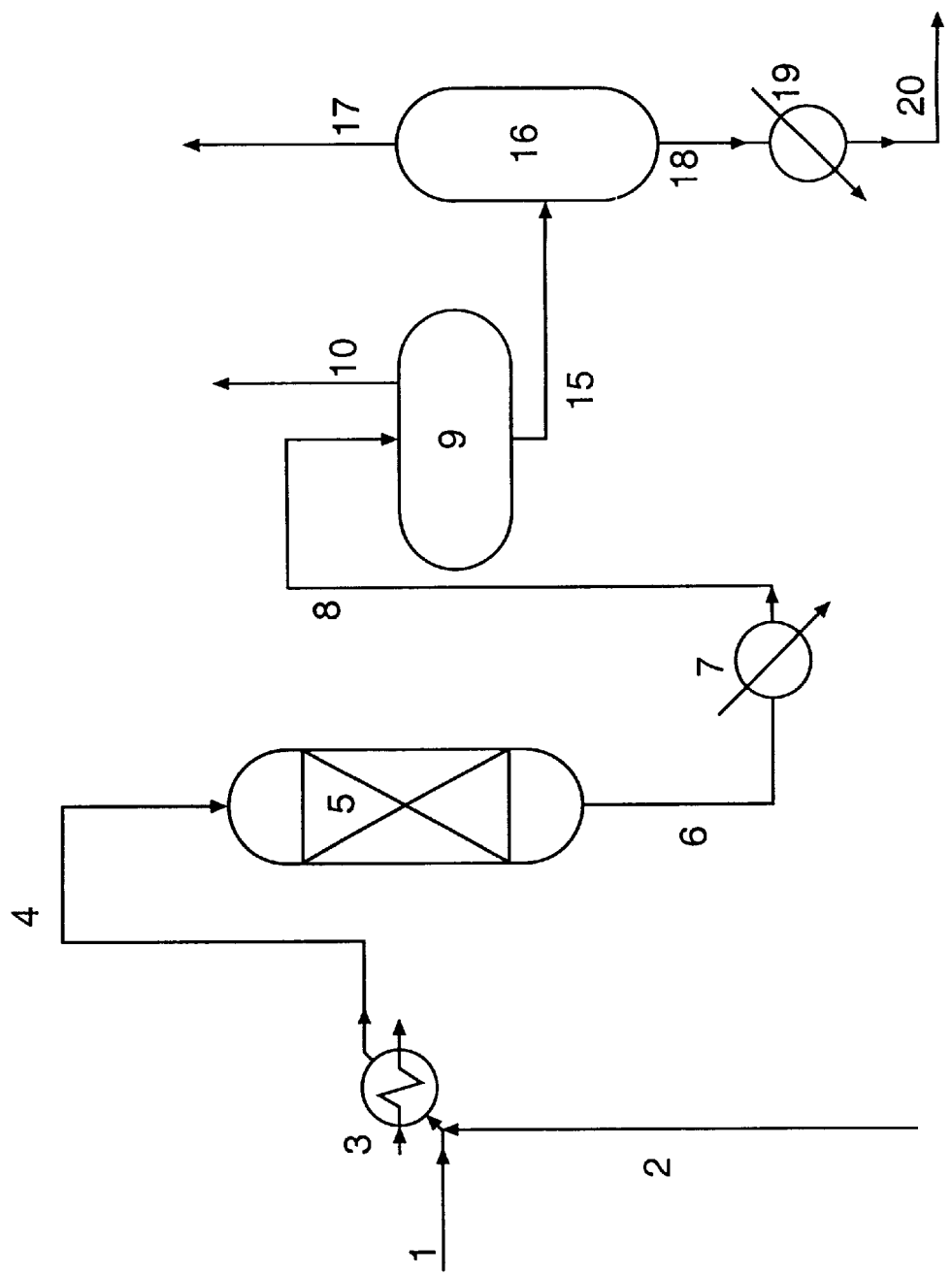
FIG. 2 is the second flow scheme according to the present invention.
Figure 3:
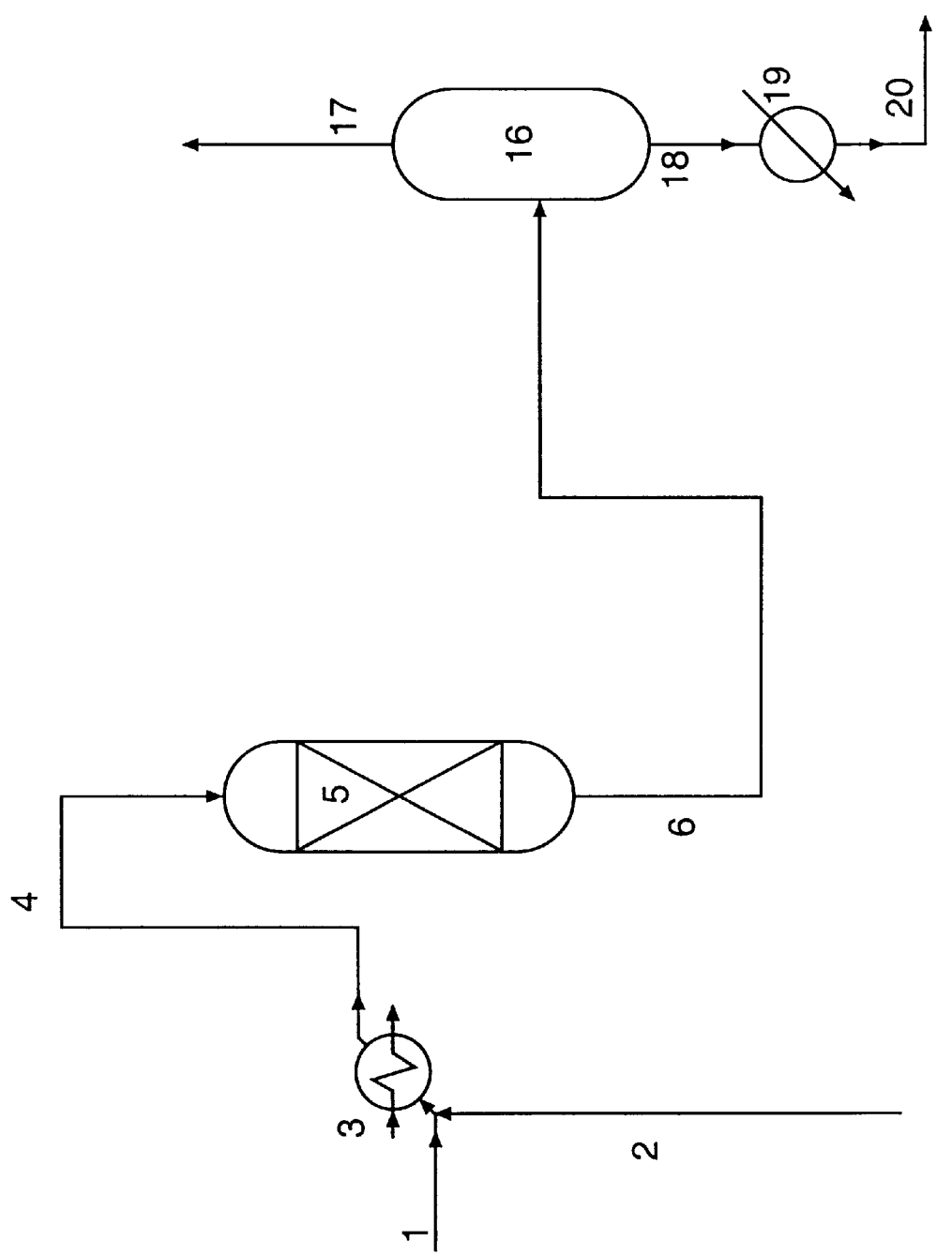
FIG. 3 is the third flow scheme according to the present invention.

The present invention Is further illustrated by the following examples, but is not thus limited.

Example 1

The preparation of the hydrorefining catalyst carrier used in the process according to the present invention is illustrated by this example.

5000 g of the aluminum hydroxide powder A(with a solid content of 70 wt %, a pseudo-boehmite content of 85 wt %, available from the Shandong Aluminum Factory) were added with proper amount of extruding aids and water, and then the resultant mixture was extruded into trilobular bars of circumscribed circle diameter of 1.6 mm. The resultant bars were dried at 120° C. for 2 hours and calcined at 600° C. for 4 hours. The bars were cut into 2–3 mm in length to give the carrier $Z_1$. The specific surface area and pore volume of the carrier $Z_1$ are shown in Table 2. Said specific surface area and pore volume were measured by the BET method of nitrogen adsorption at low temperature ( the same thereinafter).

Example 2

The preparation of the hydrorefining catalyst carrier used in the process according to the present invention is illustrated by this example.

500 g of the aluminum hydroxide powder A as used in Example 1 ( with a solid content of 70 wt %, a pseudo-boehmite content of 85 wt %, available from the Shandong Aluminum Factory) and 500 g of the aluminum hydroxide powder B (with a solid content of 70 wt %, a pseudo-boehmite content of 70 wt %, available from the Catalyst Factory of Changling Refinery) were mixed thoroughly, and added with a little amount of extruding aids and water, then was extruded into trilobular bars of circumscribed circle diameter of 1.6 mm, and then the resultant bars were dried at 120° C. for 2 hours and calcined at 600° C. for 4 hours. The resultant bars were cut into 2–3 mm in length to give a carrier $Z_2$. The specific surface area and pore volume of the carrier $Z_2$ are shown in Table 2.

Examples 3–5

The preparation of the catalyst carrier containing a promoter component used in the process according to the present invention is illustrated by the following examples.

49.0 g of magnesium nitrate $(Mg(NO_3)_2 \cdot 6H_2O)$ were added with deionized water to prepare a magnesium nitrate aqueous solution of 325 ml, the carrier $Z_1$ of 500 g was impregnated with the prepared magnesium nitrate solution, then dried at 120° C. for 2 hours, calcined at 550° C. for 4 hours, and a magnesium-containing carrier $Z_3$ was obtained.

By the same procedures, 37.5 g of ammonium fluoride $(NH_4F)$ and 75 ml of phosphoric acid ( with a concentration of 85.6 wt %) were taken) respectively and added with deionized water separately to prepare an aqueous ammonium fluoride solution of 325 ml and an aqueous phosphoric acid solution of 330 ml respectively. The two parts of the carrier $Z_1$ of 500 g were impregnated separately with the ammonium fluoride solution and phosphoric acid solution, then dried at 120° C. for 2 hours and calcined at 550° C. for 4 hours to give a fluorine-containing carrier $Z_4$ and a phosphorus-containing carrier $Z_5$ respectively. The promoter contents (calcualted as element) and specific surface areas and pore volumes of $Z_3$–$Z_5$ carriers are shown in Table 2. The content of phosphorus, magnesium and fluorine were measured by X-ray fluorescent spectrometry.

TABLE 2

| Example, No. | 1 | 2 | 3 | 4 | 5 |
|---|---|---|---|---|---|
| Carrier, No. | $Z_1$ | $Z_2$ | $Z_3$ | $Z_4$ | $Z_5$ |
| Promoter type | / | / | Mg | F | P |
| Promoter content, wt % | 0 | 0 | 0.93 | 3.5 | 2.0 |
| Specific surface area, m²/g | 278 | 283 | 275 | 270 | 272 |
| Pore volume, ml/g | 0.40 | 0.45 | 0.38 | 0.37 | 0.38 |

Examples 6–12

The catalysts used in the process according to the invention and the preparation thereof.

(1). A given amount of nickel nitrate $[Ni(NO_3)_2 \cdot 6H_2O]$ and ammonium molybdate $[(NH_4)_6Mo_7O_{24} \cdot 4H_2O]$ or an ammonium metatungstate aqueous solution(referred to in an abbreviated from as the AMT solution with a concentration of 77.6 g $WO_3$/100 ml sol.) were weighed respectively, and mixed, then added with deionized water to prepare 96 ml of aqueous solution containing nickel nitrate and ammonium molybdate or ammonium metatungstate. 150 g each of the carriers $Z_1$ to $Z_5$ was impregnated respectively with the prepared solution above for 4 hours, then dried at 120° C. for 2 hours and calcined at 450° C. for 4 hours, separately. The amounts of various substances used are shown in Table 3.

(2). Several parts of cobalt nitrate $[Co(NO_3)_2 6H_2O]$ in a given amount were taken respectively, and added with deionized water respectively to prepare cobalt nitrate aqueous solutions each of 94 ml, the products obtained from the step (1) were impregnated separately with the prepared cobalt nitrate aqueous solution, then calcined at 180–230° C. for 3 hours respectively, thus catalysts $C_1$–$C_7$ according to the present invention were obtained. The amount of cobalt nitrate used, calcination temperature and the contents of various components in $C_1$–$C_7$ catalysts are shown in Table 3, among them, the contents of cobalt, nickel, molybdenum, tungsten, magnesium, fluorine and phosphorus were analyzed by X-ray fluorescent spectrometry.

$C_1$–$C_7$ and $C_9$ respectively. The reactions were carried out in a 100 ml hydrogenation apparatus with a loading of 50 ml catalyst under the reaction conditions of a reaction temperature 180° C., a hydrogen partial pressure 0.7 Mpa, a LHSV 4.0 $h^{-1}$ and a H/oil volume ratio 25. The properties of the

TABLE 3

| Example No. | 6 | 7 | 8 | 9 | 10 | 11 | 12 |
|---|---|---|---|---|---|---|---|
| Catalyst No. | $C_1$ | $C_2$ | $C_3$ | $C_4$ | $C_5$ | $C_6$ | $C_7$ |
| Carrier No. | $Z_1$ | $Z_1$ | $Z_1$ | $Z_3$ | $Z_4$ | $Z_5$ | $Z_1$ |
| Preparation of catalyst | | | | | | | |
| Amount of nickel nitrate used, g | 15.60 | 13.25 | 15.90 | 17.80 | 16.50 | 16.60 | 23.40 |
| Amount of ammonium molybdate used, g | | | 20.50 | | | | |
| Amount of AMT solution used, ml | 16.40 | 13.50 | | 13.00 | 16.70 | 16.50 | 18.70 |
| Amount of cobalt nitrate used, g | 0.40 | 0.65 | 0.95 | 0.98 | 1.58 | 1.15 | 0.69 |
| Temperature of calcination, ° C. | 180 | 200 | 230 | 200 | 210 | 180 | 230 |
| Analysis of the catalysts: | | | | | | | |
| CoO, wt % | 0.05 | 0.10 | 0.15 | 0.16 | 0.25 | 0.18 | 0.10 |
| $NiO_3$, wt % | 2.40 | 2.05 | 3.25 | 2.79 | 2.50 | 2.57 | 3.51 |
| $WO_3$, wt % | 7.65 | 6.34 | | 6.06 | 7.68 | 7.63 | 8.50 |
| $MoO_3$, wt % | | | 7.38 | | | | |
| Atom ratio of Ni + Co/Ni + Co + WorMo | 0.50 | 0.51 | 0.46 | 0.60 | 0.53 | 0.53 | 0.56 |
| Promoter: | | | | | | | |
| Type | | | | Mg | F | P | |
| Content, wt % | | | | 0.76 | 2.67 | 1.53 | |

Comparative Example 1

This comparative example is used to illustrate a reference catalyst and the preparation thereof.

24.25 g of nickel nitrate [$Ni(NO_3)_2 \cdot 6H_2O$] were weighed, 18.80 ml of said AMT solution used in the examples 6–12 were taken, and mixed and added with deionized water to prepare 94 ml of aqueous solution containing nickel nitrate and ammonium metatungstate. 150 g of the carrier $Z_1$ were impregnated with the above prepared solution for 4 hours, then dried at 120° C. for 2 hours and calcined at 450° C. for 4 hours. A reference catalyst numbered as $C_8$ was obtained. The catalyst $C_8$ comprises 3.62 wt % of nickel oxide, 8.53 wt % of tungsten oxide and has an atom ratio of nickel to nickel plus tungsten of 0.56.

Example 13

The hydrofining catalyst used in the process according to the invention and the preparation thereof.

This catalyst was prepared according to the amounts of various substances used and procedures as in Example 9, except that the alumina carrier was co-impregnated with 95 ml of a mixed aqueous solution containing nickel nitrate and cobalt nitrate and the AMT solution, then calcined at 450° C. for 4 hours, a catalyst numbered as $C_9$ was obtained. The catalyst $C_9$ comprised 0.16 wt % of cobalt oxide, 2.79 wt % of nickel oxide, 6.06 wt % of tungsten oxide, and 0.76 wt % of magnesium, in an atom ratio of nickel and cobalt to nickel, cobalt and tungsten of 0.60.

Examples 14–21

The process according to the present invention is illustrated by the following examples.

The demercaptanization and deacidification of #1 aviation kerosene with a distillation range of 161–220° C. shown in Table 4 as a feedstock were carried out with the catalysts reaction products are shown in Table 6. Among them, the sulfur content was measured by the microcolumemetric method (SH/T 0253-9), the mercaptan content was measured by the potentiometric titration, the acid value was analyzed by the method of SH/T 0163-92 and the chroma was measured by method GB 6540-86( the same thereinafter).

Comparable Examples 2–6

The following comparative examples are used to illustrate the methods of the hydrodemercaptanization and deacidification when reference catalysts were used.

The hydrodemercaptanization and deacidification were carried out according to the same procedures as that of Examples 14–21, except that the catalysts used were the reference catalyst $C_8$, a catalyst commercially branded as CH-17 (available from the Catalyst Factory of the Changlin Refinery), a catalyst commercial branded as CH-18 (available from the Catalyst Factory of the Changlin Refinery), a catalyst D prepared in Example 7 of CN 1,169,337 A ( which performed the highest activity in the patent application) and a deactivated catalyst CH-18 discharged from a unit of pre-hydrogenation reforming ( said pre-hydrogenation reforming process was operated at a reaction temperature of 300° C. and a reaction pressure of 2 MPa). The catalysts CH-17, CH-18, D and the deactivated catalyst CH-18 were numbered respectively and sequentially as $C_{10}$, $C_{11}$, $C_{12}$ and $C_{13}$. Their compositions, atom ratios, specific surface areas and pore volumes are shown in Table 5, and the properties of their reaction products are shown in Table 7.

TABLE 4

| Name of feedstock | Aviation kerosene | Aviation kerosene | Aviation kerosene | Aviation kerosene |
|---|---|---|---|---|
| Feedstock No. | #1 | #2 | #3 | #4 |
| $D_4^{20}$, g/cm$^3$ | 0.7916 | 0.7864 | 0.7818 | 0.7990 |
| Sulfur content, ppm | 2170 | 1470 | 1490 | 250 |
| Mercaptan sulfur, ppm | 128 | 105 | 114 | 37 |
| Acid value, mg KOH/g | 0.039 | 0.031 | 0.031 | 0.029 |
| Chroma, No. | 19 | 20 | 22 | 18 |
| Distillation range, °C. | | | | |
| Initial b.p. | 161 | 162 | 162 | 147 |
| 10% | 173 | 171 | 171 | 163 |
| 50% | 186 | 184 | 185 | 187 |
| 90% | 207 | 209 | 211 | 225 |
| Dry point | 220 | 228 | 220 | 242 |

TABLE 5

| Catalyst No. | Specific surface, m$^2$/g | Pore volume, ml/g | Composition of metal, wt % | Atom ratio Ni(Co) to Ni(Co$_3$), W(Mo) |
|---|---|---|---|---|
| $C_{10}$ | 230 | 0.40 | NiO: 6.5 MO$_3$:19.5 K:0.49 | 0.39 |
| $C_{11}$ | 174 | 0.31 | CoO:0.05 NiO:2.40 WO$_3$:20.0 Mg:0.08 | 0.27 |
| $C_{12}$ | 170 | 0.30 | CoO:0.09 NiO:2.50 WO$_3$:22.6 Mg:1.0 | 0.26 |
| $C_{13}$ | 160 | 0.28 | CoO:0.04 NiO:2.10 WO$_3$:19.5 Mg:0.53 | 0.26 |

TABLE 6

| Example No. | 14 | 15 | 16 | 17 | 18 | 19 | 20 | 21 |
|---|---|---|---|---|---|---|---|---|
| Catalyst No. | C1 | C2 | C3 | C4 | C5 | C6 | C7 | C9 |
| Mercaptan sulfur content of product, ppm | 13 | 12 | 12 | 9 | 8 | 9 | 13 | 16 |
| Total sulfur content of product, ppm | 1985 | 1978 | 1979 | 1977 | 1978 | 1981 | 1990 | 1995 |
| Acid value of product, mg KOH/g | 0 | 0 | 0 | 0 | 0 | 0 | 0 | 0 |
| Chroma, No. | 27 | 27 | 27 | 27 | 27 | 27 | 27 | 27 |

TABLE 7

| Example No. | Comp. Exp. 2 | Comp. Exp. 3 | Comp. Exp. 4 | Comp. Exp. 5 | Comp. Exp. 6 |
|---|---|---|---|---|---|
| Catalyst No. | $C_8$ | $C_{10}$ | $C_{11}$ | $C_{12}$ | $C_{13}$ |
| Mercptan sulfur content of product, ppm | 38 | 31 | 29 | 28 | 35 |
| Total sulfur content of product, ppm | 2100 | 2062 | 2048 | 2043 | 2068 |
| Acid value of product, mg KOH/g | 0.025 | 0.019 | 0.018 | 0.017 | 0.019 |
| Chroma, No. | 27 | 27 | 27 | 27 | 27 |

Examples 22–29

The process according to the present Invention is illustrated by the following Examples.

The hydrodemercaptanization and deacidification were carried out according to the same procedures as that of Examples 14–21, except for the reaction temperature of 200° C. The properties of reaction products are shown in Table 8.

Comparative Examples 7–11

The following comparative examples are used to illustrate the methods of hydrodemercaptanization and deacidification by using the reference catalysts.

The hydrodemercaptanization and deacidification were carried out according to the same procedures as that of the examples 22–29, except that the catalysts used were the reference catalysts $C_8$, $C_{10}$, $C_{11}$, $C_{12}$ and $C_{13}$. The properties of reaction products are shown in Table 9.

TABLE 8

| Example No. | 22 | 23 | 24 | 25 | 26 | 27 | 28 | 29 |
|---|---|---|---|---|---|---|---|---|
| Catalyst No. | $C_1$ | $C_2$ | $C_3$ | $C_4$ | $C_5$ | $C_6$ | $C_7$ | $C_9$ |
| Mercaptan sulfur content of product, ppm | 10 | 10 | 11 | 6 | 6 | 6 | 11 | 15 |
| Total sulfur content of product, ppm | 1965 | 1968 | 1970 | 1963 | 1964 | 1962 | 1973 | 1980 |
| Acid value of product, mg KOH/g | 0 | 0 | 0 | 0 | 0 | 0 | 0 | 0 |
| Chroma, No. | 28 | 28 | 28 | 28 | 28 | 28 | 28 | 28 |

TABLE 9

| Example No. | Comp. Exp. 7 | Comp. Exp. 8 | Comp. Exp. 9 | Comp. Exp. 10 | Comp. Exp. 11 |
|---|---|---|---|---|---|
| Catalyst No. | $C_8$ | $C_{10}$ | $C_{11}$ | $C_{12}$ | $C_{13}$ |
| Mercaptan sulfur content of product, ppm | 28 | 25 | 24 | 23 | 25 |
| Total sulfur of content product, ppm | 2059 | 2023 | 2020 | 2020 | 2020 |
| Acid value of product, mg KOH/g | 0 | 0 | 0 | 0 | 0 |
| Chroma, No. | 27 | 27 | 27 | 27 | 27 |

Examples 30–37

The process according to the present invention is illustrated by the following Examples.

The hydrodemercaptanization and deacidification were carried out according to the same procedures as that of Examples 14–21, except for the reaction temperature of 220° C. The properties of the reaction products are shown in Table 10.

TABLE 10

| Example No | 30 | 31 | 32 | 33 | 34 | 35 | 36 | 37 |
|---|---|---|---|---|---|---|---|---|
| Catalyst No. | $C_1$ | $C_2$ | $C_3$ | $C_4$ | $C_5$ | $C_6$ | $C_7$ | $C_9$ |
| Mercaptan sulfur content of product, ppm | 8 | 8 | 8 | 4 | 4 | 4 | 8 | 9 |
| Total sulfur content of product, ppm | 1959 | 1961 | 1960 | 1953 | 1950 | 1950 | 1957 | 1968 |
| Acid value of product, mg KOH/g | 0 | 0 | 0 | 0 | 0 | 0 | 0 | 0 |
| Chroma, No. | 28 | 28 | 28 | 28 | 28 | 28 | 28 | 28 |

Comparative Examples 12–16

The following comparative examples are used to illustrate the processes of hydrodemercaptanization and deacidification by using the reference catalysts.

The hydrodemercaptanization and deacidification were carried out according to the same procedures as that of Examples 30–37, except that the catalysts used were the reference catalysts $C_8$, $C_{10}$, $C_{11}$, $C_{12}$ and $C_{13}$. The properties of the reaction products are shown in Table 11.

TABLE 11

| Example No. | Comp. Exp. 12 | Comp. Exp. 13 | Comp. Exp. 14 | Comp. Exp. 15 | Comp. Exp. 16 |
|---|---|---|---|---|---|
| Catalyst No. | $C_8$ | $C_{10}$ | $C_{11}$ | $C_{12}$ | $C_{13}$ |
| Mercaptan sulfur content of product, ppm | 13 | 9 | 8 | 8 | 9 |
| Total sulfur content of product, ppm | 2033 | 2010 | 2008 | 2005 | 2020 |
| Acid value of product, mg KOH/g | 0 | 0 | 0 | 0 | 0 |
| Chroma, No. | 27 | 28 | 28 | 28 | 27 |

It can be seen from the results shown in Tables 6–11 that: (1) When the reactions were carried out at 220° C. and under the same other process conditions with the process according to the present invention, the mercaptan contents and acid values of the products were at the levels comparable to those of the reference catalysts, and the products met the quality requirements for 3 # jet fuel (the mercaptan sulfur contents in products not higher than 20 ppm, the acid values not higher than 0.015 mg KOH/g, and the total sulfur contents not higher than 2000 ppm), while the color of the products were obviously improved. But with the reference catalysts, the total sulfur contents of products were slightly higher. (2). When the reactions were carried out at 180° C. and 200° C. and under the same other conditions with the process according to the present invention, the products obtained met the quality requirements for 3 # jet fuel, while the color of products were obviously improved. The mercaptan sulfur contents and acid values of the products were all obviously lower than those obtained by the processes using the reference catalysts. When the reference catalysts were used, at least one of the indexes of mercaptan content, acid value and sulfur content of their products were not in conformity with the quality requirements for 3# jet fuel. (3). When the demercaptanization of feedstock was carried out with the process according to the present invention, the mercaptan sulfur content of the products are increased very slowly with the decrease of the reaction temperature, but with the reference catalysts, the mercaptan sulfur content of the products increased very obviously. above-said results show that the process according to the present invention can be carried out at much lower temperature, none of the existing techniques in the art can match the inventive process in this point.

Examples 38–40

The process according to the present invention is illustrated by the following Examples.

The hydrodemercaptanization and deacidification were carried out with the same feedstock oil and procedures as Example 22, except only for different reaction pressures and H/oil volume ratios. The properties of reaction products obtained under different pressures at a H/oil volume ratio of 30 are shown in Table 12.

TABLE 12

| Example No. | 38 | 39 | 40 |
|---|---|---|---|
| Reaction pressure, MPa | 0.3 | 0.7 | 1.5 |
| H-Oil volume Ratio | 30 | 30 | 30 |
| Mercaptan sulfur content of product, ppm | 7 | 9 | 13 |
| Acid value of product, mg KOH/g | 0 | 0 | 0 |

Examples 41–43

The process according to the present invention is illustrated by the following Examples.

The hydrodemercaptanization and deacidification were carried out with the same feedstocks and procedures as Example 22, except for different space velocities and H/oil volume ratios. The properties of the reaction products obtained at a H/oil volume ratio of 30 and with different space velocities are shown in Table 13.

TABLE 13

| Example No. | 41 | 42 | 43 |
|---|---|---|---|
| LHSV, $h^{-1}$ | 2 | 4 | 6 |
| H/oil volume ratio | 30 | 30 | 30 |
| Mercaptan sulfur content of product, ppm | 7 | 9 | 8 |
| Acid value of product, mg KOH/g | 0 | 0 | 0 |

Examples 44–47

The process according to the present invention is illustrated by the following Examples.

The hydrodemercaptanization and deacidification were carried out faith the same feedstocks and procedures as Example 22, except only for different ratios of H/oil. The properties of the reaction products obtained at different H/oil ratios are shown in Table 14.

TABLE 14

| Example No. | 44 | 45 | 46 | 47 |
|---|---|---|---|---|
| H/oil volume ratio | 5 | 10 | 15 | 20 |
| Mercaptan sulfur content of product, ppm | 17 | 15 | 13 | 11 |
| Acid value of product, mg KOH/g | 0.009 | 0.008 | 0 | 0 |

Examples 48–50

The process according to the present invention is illustrated by the following Examples.

The hydrodemercaptanization and deacidification were carried out with the same feedstock and procedures as Example 22, except only for different hydrogen sources and H/oil ratios. The properties of the products obtained with different hydrogen sources at H/oil ratio of 30 are shown in Table 15.

TABLE 15

| Example No. | 48 | 49 | 50 |
|---|---|---|---|
| Hydrogen source | $H_2$ containing 0.5 wt % $H_2S$ | $H_2$ containing 1.5 wt % $H_2S$ | $H_2$ containing 25 Vol. % $N_2$ |
| H/Oil volume ratio | 30 | 30 | 30 |
| Mercaptan sulfur content of product, ppm | 8 | 9 | 9 |
| Acid value of product, mg KOH/g | 0 | 0 | 0 |

Examples 51–52

The process according to the present invention is illustrated by the following Examples.

The hydrodemercaptanization and deacidification were carried out according to the same procedures of Example 22, except for different reaction temperatures. The properties of the reaction products obtained at different reaction temperatures are shown in Table 16.

TABLE 16

| Example No. | 51 | 52 |
|---|---|---|
| Reaction temperature, ° C. | 160 | 170 |
| Mercaptan sulfur content of product, ppm | 14 | 13 |
| Acid value of product, mg KOH/g | 0 | 0 |

It can be seen from the results shown in Tables 12–16 that: (1). When the process according to the present invention was carried out even under very moderate hydrogenation conditions (the reaction temperature lower than 200° C., even at 160° C. and the H/oil ratio not greater than 30), the mercaptan sulfur contents and acid values of the reaction products all met the quality requirements for 3# jet fuel. (2). When the hydrodemercaptanization and deacidification according to the process of the present invention were carried out at a reaction temperature below 200° C., the variation of the mercaptan sulfur content of the product with the reaction temperature was not great. Referring to the results show in Tables 6–11, it can be found that though when the catalysts of prior art were used at a high temperature, their demercaptanization effects were on a par with that of the process according to the present invention , but, when used at a reaction temperature below 200° C., the mercaptan sulfur contents of their reaction products were increasing significantly with the dropping reaction temperature and could not meet the quality requirements for 3 # jet fuel,

Examples 53–55

The process according to the present invention is illustrated by the following Examples.

The hydrodemercaptanization and deacidification of the feedstock were carried out according to procedures of Example 22, except that 2#, 3# and 4# aviation kerosene were used as feedstock oils having different distillation ranges of 162–228° C., 162–220° C. and 147–242° C. respectively as shown in Table 4, and also different reaction conditions. The reaction conditions and properties of the reaction products are shown in Table 17.

TABLE 17

| Example, No. | 53 | 54 | 55 |
|---|---|---|---|
| Feedstock, No. | 2 | 3 | 4 |
| Reaction pressure, MPa | 0.7 | 0.7 | 0.7 |
| Reaction temperature ° C. | 180 | 180 | 180 |
| LHSV, $h^{-1}$ | 6.0 | 4.0 | 4.0 |
| H/Oil volume ratio | 30 | 30 | 30 |
| Mercaptan sulfur content of product, ppm | 12 | 8 | 4 |
| Acid value of product, mg KOH/g | 0 | 0 | 0 |

It can be seen from the results show in Table 17 that the process according to the present invention has a wide adaptability flexibility to different oil products

Example 56

The following example shows the stability of the hydrodemercaptanization process according to the present invention.

In a 100 ml hydrogenation apparatus with 100 ml of the catalyst loading, the hydrodemercaptanization and deacidification were carried out by using 1# aviation kerosene with a distillation range of 161–220° C. as a feedstock and the catalyst $C_1$ was used. The reaction conditions were: reaction temperature 240° C., hydrogen partial pressure of 0.7 Mpa, LHSV 4.0 $h^{-1}$ and H/oil volume ratio 30. The variations of the mercaptan sulfur contents and acid values of products with reaction time are shown in Table 18. Samples were taken while reaction was carrying on at the 500th, 1000th and 2000th hr respectively for analysis of the relevant properties. The results are shown in Table 19. The test was ended when the reaction was carried out at 2006 hr, then the catalyst was poured out carefully from the reactor and divided into three equal parts according to the position of the catalyst bed as upper, middle and lower layers in the reactor. Each 3 g of the catalyst from the upper, middle and lower layers were taken respectively for analysis of carbon deposit on the catalyst with a CS-344 infrared carbon and sulfur determination meter. The results are shown in Table 22.

Example 57

The following Example shows the stability of the hydrodemercaptanization process according to the present invention.

The hydrodemercaptanization and deacidification were carried out with the same feedstock and procedures as Example56, except for a reaction temperature of 180° C. variation of the mercaptan sulfur content and acid value of the product with reaction time are shown in Table 20. Samples were taken while reaction was carrying on at 500th, 1000th and 2000th hr for the analysis of the relevant properties. The results are shown in Table 21. The analysis of carbon deposit on the catalyst was carried out with the same method as Example 55, the results are shown in Table 22.

TABLE 18

| Time of reaction, hr | Content of mercaptan sulfur of formed oil, ppm | Acid value of formed oil, mg KOH/g |
|---|---|---|
| 175 | 3 | 0 |
| 366 | 5 | 0 |
| 558 | 4 | 0 |
| 840 | 7 | 0 |
| 1034 | 6 | 0 |
| 1337 | 7 | 0 |
| 1673 | 5 | 0 |
| 1961 | 5 | 0 |
| 2006 | 5 | 0 |

TABLE 19

| Item | GB6537-94 Quality Standard | #1 feedstock oil | Reaction time hr | | |
|---|---|---|---|---|---|
| | | | 500 | 1000 | 2000 |
| Chroma, No. | Reported | 19 | 26 | 27 | 27 |
| Acid value, mg KOH/g | ≯0.015 | 0.039 | 0 | 0 | 0 |
| Total sulfur, wt % | ≯0.20 | 0.217 | 0.188 | 0.180 | 0.168 |
| Mercaptan sulfur content, ppm | ≯20 | 128 | 5 | 7 | 5 |
| Doctor test | (−) | (+) | (−) | (−) | (−) |
| Silver strip corrosion test, (50° C., 4h), Grade | ≯1 | 0 | 0 | 0 | 0 |
| Copper strip corrosion test, (100° C., 4h), Grade | ≯1 | 1a | 1a | 1a | 1a |
| Distillation range, ° C. | | | | | |
| Initial | reported | 161 | 160 | 160 | 159 |
| 10% | ≯205 | 173 | 173 | 172 | 172 |
| 50% | ≯232 | 186 | 186 | 187 | 186 |
| 90% | Reported | 207 | 205 | 205 | 204 |
| Dry point | ≯300 | 220 | 220 | 221 | 220 |

TABLE 20

| Time of reaction, hr | Mercaptan sulfur of formed oil, ppm | Acid value of formed oil, mg KOH/g |
|---|---|---|
| 128 | 12 | 0 |
| 246 | 13 | 0 |
| 300 | 11 | 0 |
| 508 | 12 | 0 |
| 705 | 11 | 0 |
| 1506 | 11 | 0 |
| 1750 | 11 | 0 |
| 2006 | 11 | 0 |

TABLE 21

| Item | GB6537-94 Quality Standard | #1 feedstock oil | Reaction time hr 500 | 1000 | 2000 |
|---|---|---|---|---|---|
| Chroma, No. | Reported | 19 | 26 | 27 | 21 |
| Acid value, mg KOH/g | ≯0.015 | 0.039 | 0 | 0 | 0 |
| Total sulfur content, Wt % | ≯0.20 | 0.217 | 0.185 | 0.183 | 0.175 |
| Mercaptan sulfur content, ppm | ≯20 | 128 | 13 | 11 | 11 |
| Doctor test | (−) | (+) | (−) | (−) | (−) |
| Silver strip corrosion test, (50° C., 4h), Grade | ≯1 | 0 | 0 | 0 | 0 |
| Copper strip corrosion test, (100° C., 4h), Grade | ≯1 | 1a | 1a | 1a | 1a |
| Distillation range, ° C. | | | | | |
| Initial | reported | 161 | 160 | 160 | 161 |
| 10% | ≯205 | 173 | 173 | 172 | 172 |
| 50% | ≯232 | 186 | 186 | 185 | 186 |
| 90% | reported | 207 | 205 | 206 | 206 |
| dry point | ≯300 | 220 | 220 | 220 | 221 |

TABLE 22

| Catalyst position in reactor | upper | middle | lower | Average |
|---|---|---|---|---|
| Amount of carbon deposit in the catalyst of Example 56, wt % | 6.58 | 5.87 | 5.03 | 5.83 |
| Amount of carbon deposit in the catalyst of Example 57, wt % | 6.15 | 5.63 | 4.87 | 5.55 |

The results show in Tables 18 to 22 show that the process provided according to the present invention has excellent stability. More unexpectedly, the stability of the demercaptanization activity of the process according to the invention is also very high under the conditions of low temperature and low H/oil volume ratio. Furthermore, it can be seen from the analysis of carbon deposit on the catalyst that the process provided according to the invention can be operated at lower temperature for a longer period of runing time.

Example 58

The process according to the present invention is illustrated by the following Example.

Figure 4:
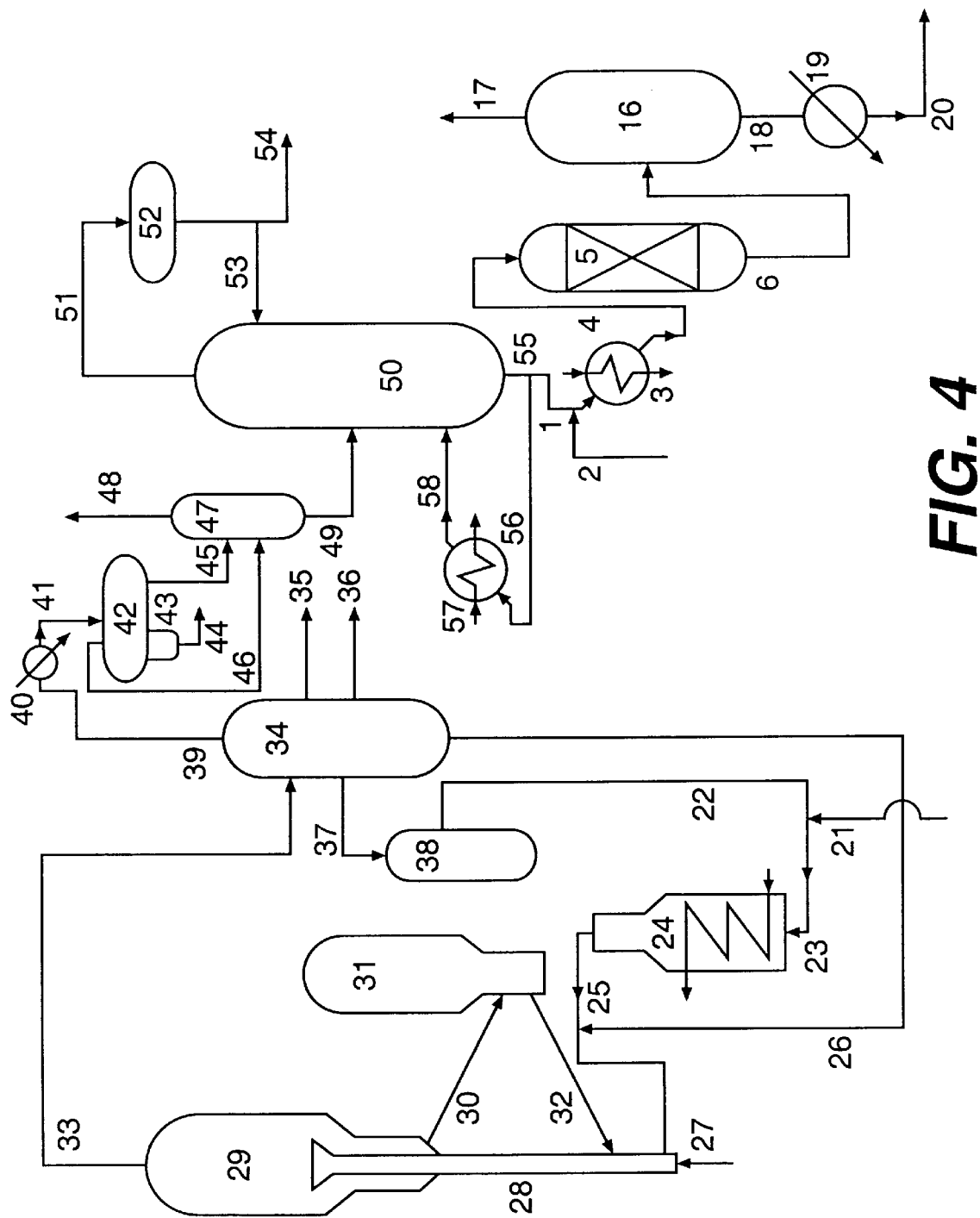
FIG. 4 is the fourth flow scheme according to the present invention.
Figure 5:
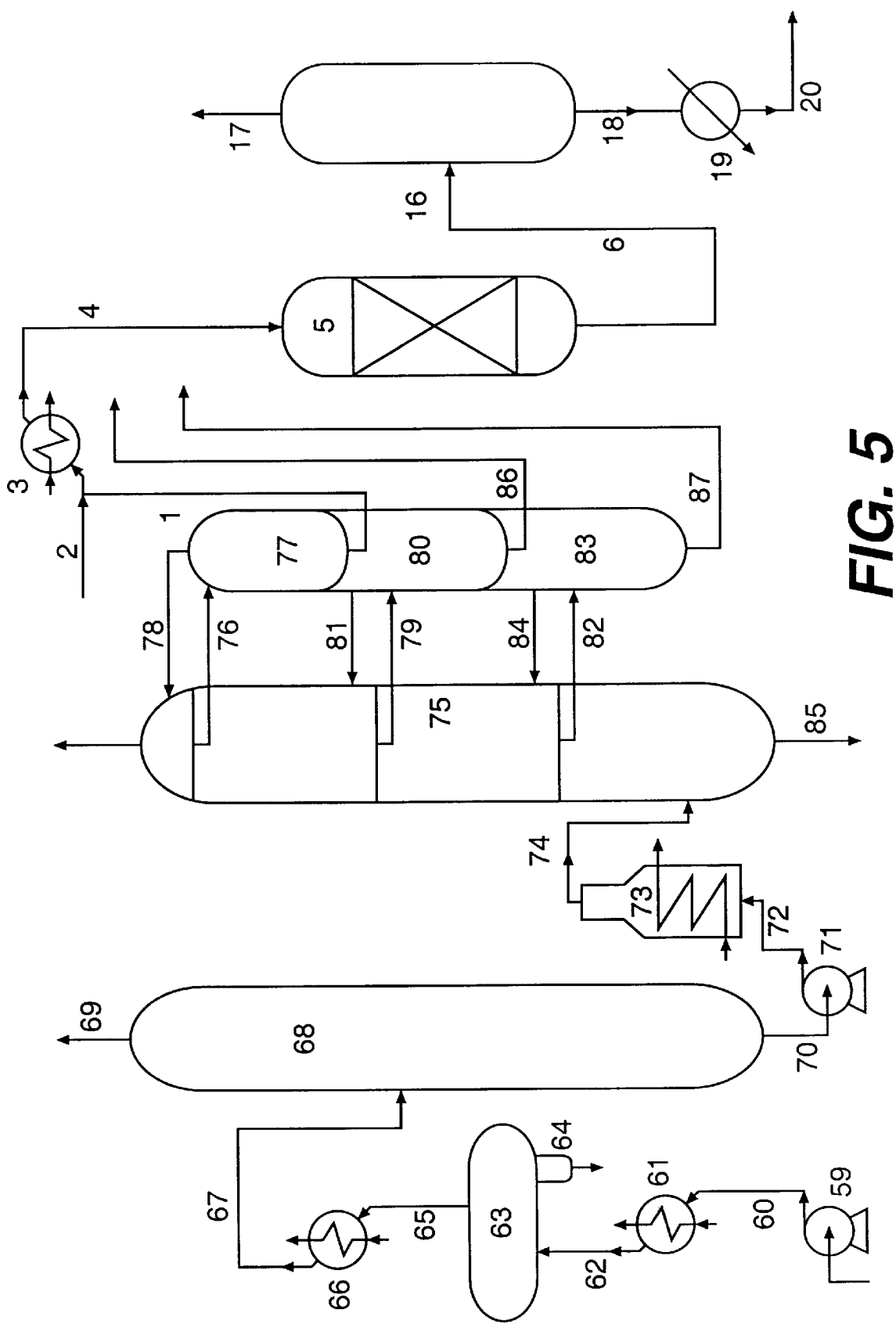
FIG. 5 is the fifth flow scheme according to the present invention.

A vacuum wax oil from a petroleum pipeline, a hydrogenated light coking wax oil and a heavy coking wax oil were mixed to form a mixed oil comprising 80 wt % of vacuum wax oil ,16.1 wt % of light coking wax oil and 3.9 wt % of heavy coking wax oil. The properties of said mixed oil are listed in Table 16. Following the flow scheme shown in FIG. 4, said mixed oil was mixed again with a recycle oil (having a recycle ratio of 1.47) from a catalytic cracking apparatus, then heated to 390° C., and then mixed with a bottom oil slurry from a fractionation tower ( in a amount of 10 wt % of fresh feedstock) by means of spraying with vapor steam having a 10 kg/cm² grade of pressure and 250° C. temperature ( in a feedstock/steam weight ratio of 100). After being mixed, the mixed material was fed into a riser reactor, in which said mixed material underwent the reaction by contacting with the catalytic cracking catalyst (available from the Zhoucun Catalyst Factory, commercially branded as Orbit-300, comprising the active constituents of the rare-earth dealuminum Y and rare earth HY) from the regenerator having a temperature of 550° C., and a catalyst/oil weight ratio of 5.9 and the regeneration temperature of the catalyst was 690° C. Then the catalyst was separated from the reaction product via a settler, the separated reaction product flew into a fractionation tower from bottom ( which has an operation pressure of 0.08 MPa, a top temperature of 120° C.,and a bottom temperature of 375° C.). The top effluent from the fractionation tower was cooled to 60° C., and transferred to an oil-gas separator, the separated naphtha and rich gas flew into an absorption tower respectively from upper part and lower part of the absorption tower, where the rich gas was absorbed with the naphtha in reverse flow mode under the conditions of 43° C. and 1.25 MPa. The dethanized gasoline at bottom entered in a rectification tower for rectifying, the rectification tower was operated under the conditions of 1.1 MPa, a top temperature 58° C., a reflux ratio 2.5, a bottom temperature 165° C. and a controlled liquid level 60%. The FCC gasoline at the tower bottom was mixed with hydrogen in a H/oil volume ratio of 25, and heated to 180° C. via a heat exchanger, then entered in a hydrodemercaptanization reactor packed with the catalyst $C_1$. In the hydrodemercaptanization reactor the reaction pressure was 0.51 MPa, LHSV was 4.0 $h^{-1}$. After reaction, the product flew to a steam stripper, which was operated under the conditions of a top temperature of 18° C., a bottom temperature 180° C., a tower pressure of 0.5 MPa and without liquid discharged off from the top reflux tank due to full reflux, and the non-condensable gas from the stripper was emitted off. After cooled, the bottom product was the gasoline product qualified in the mercaptan sulfur content. The results of analysis of the FCC gasoline and hydrodemercaptanized gasoline are shown in Table 23.

TABLE 23

| Item | FCC feedstock oil | FCC gasoline | Hydrodemercaptanized gasoline |
|---|---|---|---|
| Density, (20° C.) g/cm³ | 0.9087 | 0.7203 | 0.7215 |
| Carbon residual, wt % | 0.87 | — | — |
| Viscosity, m²/sec (80° C.) | 49.67 | — | — |
| Distillation range, ° C. | | | |
| Initial point | 285 | 38 | 45 |
| 90% | 498 | 195 | 193 |
| Dry point | — | 204 | 203 |
| Induction period, min | — | 600 | 625 |
| Actual gum, mg/100 ml | — | 0.25 | 0.07 |
| RON | — | 92.2 | 88.9 |
| MON | — | 81.0 | 78.0 |
| Total sulfur content, | 1.08 wt % | 957 ppm | 732 ppm |
| Nitrogen content, | 0.25 wt % | 23.3 ppm | 22.0 ppm |
| Mercaptan sulfur content, ppm | — | 212 ppm | 10 |
| Doctor test | — | unqualified | (−) |
| Acid value, mg KOH/g | — | 0.045 | 0 |
| Bromine value, g Br/100 g | — | 43 | 38 |

Example 59

The process according to the present invention is illustrated by the following Example.

The desalted and dewatered, Arab mixed crude oil ( its properties seen in Table 16) was heated to 360° C. in an atmospheric heating furnace, then entered in an atmospheric distillation tower( at an operation pressure of 0.18 MPa), the atmospheric first side-line drawn oil flew into an atmospheric first side-line stripper( at an operation pressure of 0.24 MPa, bottom temperature of 230° C.), where the atmospheric first side-line aviation kerosene was cut out at 160° C. with a distillation range of 145–252° C. The resultant atmospheric first side-line aviation kerosene was mixed with hydrogen in a H/oil volume ratio of 30, then heated to 180° C. via a heat exchanger, and then flew into a hydrodemercaptanization reactor packed with the catalyst C1. The reactor was operated under the conditions of a pressure of 0.65 Mpa and a LHSV of 4.0 h−1. The hydrogenation product flew into a steam stripper, which was operated under the conditions of a pressure of 0.58 MPa, top temperature of 37° C., bottom temperature of 220° C. and the top full reflux with the top liquid and the non-condensable gas was emitted off. After cooled, the bottom product of the tower was the qualified product. The properties of the atmospheric first side-line aviation kerosene and hydrodemercaptanized aviation kerosene are shown in Table 24.

TABLE 24

| Item | Arabic mixed crude oil | Atmospheric first side-line aviation kerosene | Hydrodemercaptanized aviation kerosene |
|---|---|---|---|
| Density, (20° C.) g/cm3 | 0.8598 | 0.7835 | 0.7840 |
| Total sulfur content, wt % | 2.15 | 0.18 | 0.125 |
| Mercaptan sulfur content, ppm | — | 135 | 5 |
| Nitrogen content, ppm | 1128 | 4.0 | 6 |
| Aromatics content, vol % | — | 18.5 | 16.7 |
| Acid value, mg KOH/g | — | 0.056 | 0 |
| Doctor test | — | unqualified | (−) |
| Smoking point, ° C. | — | 23.5 | 25.0 |
| Color, No. | — | 19 | 27 |
| Distillation range, ° C. | — | | |
| Initial point | — | 145 | 145 |
| Dry point | — | 252 | 252 |

What is claimed is:

1. A conversion process of hydrocarbon oils comprising at least a hydrodemercaptanization process which comprises contacting a feedstock having a total sulfur content not higher than 0.35 wt %, a mercaptan sulfur content higher than 20 ppm with a hydrofining catalyst under the conditions of the hydrodemercaptanization process and recovering a product having a decreased mercaptan sulfur content, wherein the conditions of said hydrodemercaptanization involve a H/oil volume ratio not less than 5, and that said hydrofining catalyst comprises a tungsten oxide and/or a molybdenum oxide, a nickel oxide and a cobalt oxide supported on an alumina carrier, in which, based on the weight of the catalyst, the content of said tungsten oxide and/or molybdenum oxide is from 4 wt % to less than 10 wt %, the content of nickel oxide is 1 to 5 wt %, the content of cobalt oxide is 0.01–1 wt % and the ratio of the total atom number of nickel and cobalt to that of nickel, cobalt, tungsten and/or molybdenum is 0.3 to 0.9.

2. The process according to claim 1, wherein the content of the nickel oxide of said hydrofining catalyst is, 2 to 4 wt %.

3. The process according to claim 1, wherein the content of the cobalt oxide of said hydrofining catalyst is 0.02 to 0.5 wt %.

4. The process according to claim 1, wherein the content of the tungsten oxide and/or molybdenum oxide of said hydrofining catalyst is 4.5 to 9 wt %.

5. The process according to claim 1, wherein said ratio of the total atom number of nickel and cobalt to that of nickel, cobalt, tungsten and/or molybdenum is 0.4 to 0.7.

6. The process according to claim 1, wherein said hydrofining catalyst comprises further a promoter is selected from the group consisting of the oxides of magnesium, the oxides of phosphorus and fluorine-containing compounds, the content of said promoter is 0.01 to 8 wt %, calculated as element.

7. The process according to claim 6, wherein the promoter content of said hydrofining catalyst is 0.2–5 wt %.

8. The process according to claim 1, wherein said alumina carrier is γ-alumina, η-alumina or mixture thereof.

9. The process according to claim 1, wherein said alumina carrier is a γ-alumina or an alumina essentially consisting of γ-alumina.

10. The process according to claim 1, wherein the process conditions of said hydrodemercaptanization involve a reaction temperature in the range of 149 to 315° C., a reaction pressure in the range of 0.3 to 1.5 MPa, and a LHSV in the range of 0.5 to 10 h⁻¹.

11. The process according to claim 10, wherein the reaction temperature of said hydrodemercaptanization is in the range of 150 to 260° C.

12. The process according to claim 11, wherein the reaction temperature of said hydrodemercaptanization is in the range of 150 to 200° C.

13. The process according to claim 1, wherein the H/oil volume ratio of said hydrodemercaptanization is in the range of 5 to 30.

14. The process according to claim 1, wherein the hydrogen used in the hydromercaptanization process is either a pure hydrogen, or a hydrogen having a purity higher than 50 vol % and containing inert gases, in which oxygen content is not higher than 5 ppm, hydrogen sulfide content not higher than 2 wt % and said inert gases are those having no effect on the hydromercaptanization reaction.

15. The process according to claim 1, wherein said inert gases are nitrogen, argon and/or gaseous alkane.

16. The process according to claim 1, wherein the acid value of said hydrodemercaptanization feedstocks is not less than 0.015 mg KOH/g.

17. The process according to claim 1, wherein the upstream of said hydrodemercaptanization process can further comprise a process for the preparation of said hydrodemercaptanization feedstocks.

18. The process according to claim 11, wherein said process for the preparation of the hydrodemercaptanization feedstocks is a catalytic cracking process which comprises steps of contacting the catalytic cracking feedstock with a catalytic cracking catalyst under catalytic cracking conditions and separating out the feedstock for the hydrodemercaptanization process.

19. The process according to claim 18, wherein said catalytic cracking catalyst is the one having Y-zeolite as an active constituent.

20. The process according to claim 18, wherein said hydrodemercaptanization feedstock oil is a FCC gasoline.

21. The process according to claim 17, wherein said preparation process of said hydrodemercaptanization feedstock oil is an atmospheric distillation process of crude oils which comprises distilling the crude oils under conventional atmospheric distillation conditions and separating out the feedstock oil for the hydrodemercaptanization process.

22. The process according to claim 17, wherein said preparation process of said hydrodemercaptanization feedstock oil is a thermal cracking process of heavy oils which comprises cracking the heavy oils under conventional thermal cracking conditions and separating out the feedstock oil for the hydrodemercaptanization process.

23. The process according to claim 11, wherein said hydrodemercaptanization feedstock oil is an atmospheric first side-line kerosene.

24. A conversion process of hydrocarbon oils comprises at least a hydrodemercaptanization process which comprises steps of contacting a feedstock having a total sulfur content not higher than 0.35 wt % and a mercaptan sulfur content higher than 20 ppm with a hydrofining catalyst under the conditions of the hydrodemercaptanization and recovering a product having a decreased mercaptan sulfur content, wherein the process conditions of said hydrodemercaptanization involve a H/oil volume ratio not less than 5, said hydrofining catalyst comprises a tungsten oxide and/or a molybdenum oxide, a nickel oxide and a cobalt oxide supported on an alumina carrier, the content of said tungsten oxide and/or molybdenum oxide is from 4 wt % to less than 10 wt %, the nickel oxide content is 1 to 5 wt %, and the cobalt oxide content is 0.01 to 1 wt % based on the weight of the catalyst, and the ratio of total atom number of nickel and cobalt to total atom number of nickel, cobalt, tungsten and /or molybdenum is 0.3 to 0.9; the preparation method of said hydrofining catalyst comprises steps of impregnating an alumina carrier with an aqueous solution containing a molybdenum and/or a tungsten compound and a nickel compound and a cobalt compound-containing aqueous solution, and calcining said alumina carrier on which molybdenum and/or tungsten, nickel and cobalt have been impregnated, said process of impregnation alumina carrier with said the cobalt compound-containing aqueous solution and that with said aqueous solution of the molybdenum and/or tungsten compounds and the nickel compound are carried out separately, and the process of impregnation alumina carrier with said cobalt compound-containing aqueous solution is carried out after that the alumina carrier has been impregnated with said aqueous solution of the molybdenum and/or tungsten compounds and nickel compound and calcined, the calcination temperature of the alumina carrier impregnated with the cobalt compound-containing aqueous solution is 50 to 300° C., and the time for the calcination is more than 1 hour.

25. The catalyst according to claim 24, wherein said calcination temperature of the alumina carrier impregnated with said cobalt compound-containing aqueous solution is 150 to 250° C., and said calcination time is 2 to 4 hours.

26. The process according to claim 24, wherein the process conditions of said hydrodemercaptanization involve a reaction temperature in the range of 149 to 315° C., a reaction pressure in the range of 0.3 to 1.5 MPa, and a LHSV in the range of 0.5 to 10 $h^{-1}$.

27. The process according to claim 26, wherein the reaction temperature of said hydrodemercaptanization is 150 to 260° C.

28. The process according to claim 27, wherein the reaction temperature of said hydrodemercaptanization is 150 to 200° C.

29. The process according to claim 24, wherein the H/oil volume ratio of said hydrodemercaptanization is 5 to 30.

* * * * *